United States Patent [19]

Harms

[11] Patent Number: 4,874,857
[45] Date of Patent: Oct. 17, 1989

[54] AMINOALKOXYTRIPHENDIOXAZINE DYESTUFFS USEFUL FOR DYEING AND PRINTING HYDROXYL- AND AMINO-CONTAINING MATERIALS

[75] Inventor: Wolfgang Harms, Leverkusen, Fed. Rep. of Germany

[73] Assignee: Bayer Aktiengesellschaft, Leverkusen, Fed. Rep. of Germany

[21] Appl. No.: 102,460

[22] Filed: Sep. 29, 1987

[30] Foreign Application Priority Data

Oct. 17, 1986 [DE] Fed. Rep. of Germany ....... 3635312

[51] Int. Cl.$^4$ .................. C09B 19/00; C09B 62/022; D06P 3/10; D06P 3/66
[52] U.S. Cl. ........................................ 544/75; 544/76; 544/40
[58] Field of Search .................... 544/75, 76; 260/509; 564/405

[56] References Cited

U.S. PATENT DOCUMENTS 4,591,643  5/1986  Jager ..................... 544/76

FOREIGN PATENT DOCUMENTS

| 0144580 | 6/1985 | European Pat. Off. .............. 544/76 |
| 0158857 | 10/1985 | European Pat. Off. .............. 544/76 |
| 2503611 | 8/1975 | Fed. Rep. of Germany ........ 544/76 |
| 2600490 | 7/1976 | Fed. Rep. of Germany ........ 544/75 |
| 3544982 | 6/1987 | Fed. Rep. of Germany ........ 544/75 |
| 2168459 | 8/1973 | France ................................. 544/75 |
| 769706 | 3/1957 | United Kingdom ............. 544/76 X |
| 1368158 | 9/1974 | United Kingdom .................. 544/75 |
| 1450746 | 9/1976 | United Kingdom .................. 544/76 |

Primary Examiner—Floyd D. Higel
Attorney, Agent, or Firm—Sprung, Horn, Kramer & Woods

[57] ABSTRACT

Dyestuffs of the formula

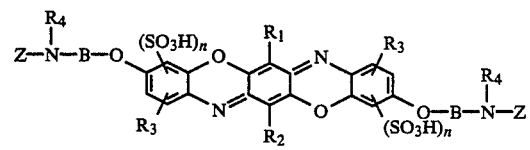

in which $R_1$, $R_2$ = H, Cl, Br, optionally substituted $C_1$–$C_4$-alkyl or $C_1$–$C_4$-alkoxy, carbonyl, aryloxy optionally substituted carboxamide or acylamino, $R_3$ = H, optionally substituted $C_1$–$C_4$-alkyl or $C_1$–$C_4$-alkoxy, Cl or Br, $R_4$ = H or alkyl, B = an aliphatic or arylene bridge member, Z = H or fiber-reactive radical, n = 0 or 1.

These dyestuffs are highly suitable for dyeing and printing hydroxyl- and amides-containing materials and produce red dyeings and prints having good wet- and light-fastness properties.

3 Claims, No Drawings

AMINOALKOXYTRIPHENDIOXAZINE DYESTUFFS USEFUL FOR DYEING AND PRINTING HYDROXYL- AND AMINO-CONTAINING MATERIALS

The present invention relates to dyestuffs of the formula

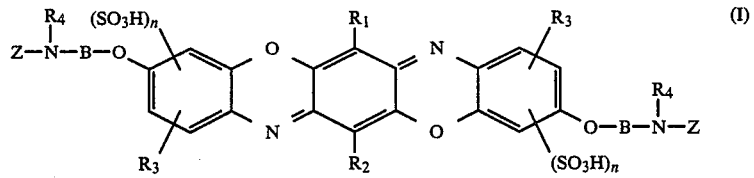

in which
$R_1$, $R_2$ = H or substituent,
$R_3$ = H or substituent,
$R_4$ = H or alkyl,
B = bridge member,
Z = H or fibre-reactive radical,
n = 0 or 1.

Suitable radicals $R_1$ and $R_2$ are for example hydrogen, Cl, Br, optionally substituted $C_1$-$C_4$-alkyl or $C_1$-$C_4$-alkoxy, carboxyl, aryloxy such as optionally substituted phenoxy, optionally substituted carboxamide and acylamino such as optionally substituted $C_1$-$C_4$-alkylcarbonylamino or phenylcarbonylamino.

Optionally substituted carboxamide can be in particular $CONH_2$ or mono- or di-$C_1$-$C_4$-alkylcarboxamide.

Suitable radicals $R_3$, in addition to hydrogen, are for example optionally substituted $C_1$-$C_4$-alkyl or $C_1$-$C_4$-alkoxy and Cl and Br.

Suitable radicals $R_4$, in addition to hydrogen, are optionally substituted $C_1$-$C_4$-alkyl, optionally substituted aralkyl, optionally substituted aryl, in particular optionally substituted phenyl.

Possible substituents for the abovementioned alkyl and phenyl radicals are in particular: $SO_3H$, $OSO_3H$, OH, COOH, $CONH_2$, CN, $S_2O_3H$, $OPO_3H_2$, $PO_3H_2$, halogen.

Suitable bridge members B are for example aliphatic ones, in particular those having 2–6 C atoms, which are optionally interrupted by hetero atoms, such as O, NH, S or N-$C_1$-$C_4$-alkyl, or which are optionally substituted, for example, by OH or $OSO_3H$, and also araliphatic or aromatic ones, in particular optionally substituted phenyl-$C_1$-$C_4$-alkylene or phenylene, possible substituents being in particular sulpho, $C_1$-$C_4$-alkyl or Cl.

Suitable aliphatic bridge members are for example: $C_2$-$C_6$-alkylene such as ethylene, 1,3- and 1,2-propylene, 1- and 2-phenylpropylene, 2-hydroxypropylene, 1,4-, 1,3-, 2,3-butylene, 1,5-pentylene, 1,6- and 2,5-hexylene, —$(CH_2$—$CH_2$—O$)_n$—$CH_2$—$CH_2$— where n=1–3, —$CH_2$—$CH_2$—S—$CH_2$—$CH_2$—, —$CH_2$—$CH_2$—NH—$CH_2$—$CH_2$—,

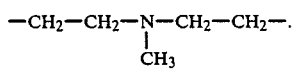

Suitable arylene radicals are for example: 1,2-, 1,3- and 1,4-phenylene, 4-sulpho-1,3-phenylene, 6-sulpho-1,3-phenylene, 2- or 3-sulpho-1,4-phenylene, 4,6-disulpho-1,3-phenylene, 3-methyl-1,4-phenylene, 2-methyl-1,4-phenylene, 4-methyl-1,3-phenylene, 6-methyl-1,3-phenylene, 5-methyl-1,2-phenylene, 3-chloro-1,4-phenylene, 4-chloro-1,3-phenylene, 4-chloro-1,2-phenylene and the corresponding sulpho-substituted methylphenylene and chlorophenylene radicals.

Suitable fibre-reactive radicals, i.e. those which react with the OH or NH groups of the fibre under dyeing conditions to form covalent bonds, are in particular those which contain at least one reactive substituent bonded to a 5- or 6-membered aromatic-heterocyclic ring, for example to a monoazine, diazine or triazine ring, in particular a pyridine, pyrimidine, pyridazine, pyrazine, thiazine, oxazine or asymmetric or symmetric triazine ring, or to such a ring system which has one or more fused-on aromatic-carbocyclic rings, for example a quinoline, phthalazine, cinnoline, quinazoline, quinoxaline, acridine, phenazine or phenanthridine ring system.

Examples of reactive substituents on the heterocycle are halogen (Cl, Br or F), ammonium including hydrazinium, sulphonium, sulphonyl, azido(—N3), thiocyanato, thio, thiolether, oxyether, sulphinic acid and sulphonic acid.

Specific examples are: 2,4-difluorotriazin-6-yl, 2,4-dichlorotriazin-6-yl, monohalo-sym.-triazinyl radicals, in particular monochlorotriazinyl and monofluorotriazinyl radicals which are substituted by alkyl, aryl, amino, monoalkylamino, dialkylamino, aralkylamino, arylamino, alkoxy, aryloxy, alkylthio or arylthio, alkyl preferably denoting optionally substituted C1–C4-alkyl, aralkyl preferably denoting optionally substituted phenyl-C1–C4-alkyl and aryl preferably denoting optionally substituted phenyl or naphthyl and preferred substituents for alkyl being hydroxyl, cyano, C1–C4-alkoxy, carboxyl, sulpho or sulphato and for phenyl and naphthyl, sulpho, C1–C4-alkyl, C1–C4-alkoxy, carboxyl, halogen or acylamino.

Specific examples are the following radicals: 2-amino-4-fluorotriazin-6-yl, 2-methylamino-4-fluorotriazin-6-yl, 2-ethylamino-4-fluorotriazin-6-yl, 2-isopropylamino-4-fluorotriazin-6-yl, 2-dimethylamino-4-fluorotriazin-6-yl, 2-diethylamino-4-fluorotriazin-6-yl, 2-β-methoxyethylamino-4-fluorotriazin-6-yl, 2-β-hydroxyethylamino-4-fluorotriazin-6-yl, 2-di-(β-hydroxyethylamino)-4-fluorotriazin-6-yl, 2-β-sulphoethylamino-4-fluorotriazin-6-yl, 2-β-sulphoethylmethylamino-4-fluorotriazin-6-yl, 2-carboxymethylamino-4-fluorotriazin-6-yl, 2-di-(carboxymethylamino)-4-fluorotriazin-6-yl, 2-sulphomethyl-methylamino-4-fluorotriazin-6-yl, 2-β-cyanoethylamino-4-fluorotriazin-6-yl, 2-benzylamino-4-fluorotriazin-6-yl, 2-β-phenylethylamino-4-fluorotriazin-6-yl, 2-benzylmethylamino-4-fluorotriazin-6-yl, 2-(x-sulphobenzyl)-amino-4-fluorotriazin-6-yl, 2-cyclohexylamino-4-fluorotriazin-6-yl, 2-(o-, m-, p-methylphenyl)-amino-4-fluorotriazin-6-yl, 2-(o-, m-, p-sulphophenyl)-amino-4-fluorotriazin-6-yl, 2-(2',5'-disulphophenyl)-amino-4-fluorotriazin-6-yl, 2-(o-, m-, p-chlorophenyl)-amino-4-fluorotriazin-6-yl, 2-(o-, m-, p-methoxyphenyl)-4- fluorotriazin-6-yl, 2-(2'-methyl-4'-sulphophenyl)-amino-4-fluorotriazin-6-yl, 2-(2'-methyl-5'-sulphophenyl)-amino-4-fluorotriazin-6-yl, 2-(2'-chloro-4'-sulphophenyl)-amino-4-fluorotriazin-6-yl, 2-(2'-chloro-(5'-sulphophenyl)-amino-4-fluorotriazin-6-yl, 2-(2'-methoxy-4'-sulphophenyl)-amino-4-fluorotriazin-6-yl, 2-(o-, m-, p-carboxyphenyl)-amino-4-fluorotriazin-6-yl, 2-(2',4'-disulphophenyl)-amino-4-fluorotriazin-6-yl, 2-(3',5'-disulphophenyl)-amino-4-fluorotriazin-6-yl, 2-(2'-carboxy-4'-sulphophenyl)-amino-4-fluorotriazin-6-yl, 2-(2'-carboxy-5'-sulphophenyl)-amino-4-fluorotriazin-6-yl, 2-(6'-sulphonaphth-2'-yl)-amino-4-fluorotriazin-6-yl, 2-(4',8'-disulphonaphth-2'-yl)-amino-4-fluorotriazin-6-yl, 2-(6',8'-disulphonaphth-2'-yl)-amino-4-fluorotriazin-6-yl, 2-(N-methylphenyl)-amino-4-fluorotriazin-6-yl, 2-(N-ethylphenyl)-amino-4-fluorotriazin-6-yl, 2-(N-β-hydroxyethylphenyl)-amino-4-fluorotriazin-6-yl, 2-(N-isopropylphenyl)-amino-4-fluorotriazin-6-yl, 2-morpholino-4-fluorotriazin-6-yl, 2-piperidino-4-fluorotriazin-6-yl, 2-(4',6',8'-trisulphonaphth-2'-yl)-4-fluorotriazin-6-yl, 2-(3',6',8'-trisulphonaphth-2'-yl)-4-fluorotriazin-6-yl, 2-(3',6'-disulphonaphth-1'-yl)-4-fluorotriazin-6-yl, N-methyl-N-(2,4-dichlorotriazin-6-yl)-carbamyl, N-methyl-N-(2-methylamino-4-chlorotriazin-6-yl)-carbamyl, N-methyl-N-(2-dimethylamino-4-chlorotriazin-6-yl)-carbamyl, N-methyl- or N-ethyl-N-(2,4-dichlorotriazin-6-yl)-amino-acetyl, 2-methoxy-4-fluorotriazin-6-yl, 2-ethoxy-4-fluorotriazin-6-yl, 2-phenoxy-4-fluorotriazin-6-yl, 2-(o-, m- or p-sulphophenoxy)-4-fluorotriazin-6-yl, 2-(o-, m- or p-methyl- or methoxyphenoxy)-4-fluorotriazin-6-yl, 2-β-hydroxyethylmercapto-4-fluorotriazin-6-yl, 2-phenylmercapto-4-fluorotriazin-6-yl, 2-(4'-methylphenyl)-mercapto-4-fluorotriazinyl, 2-(2'-dinitrophenyl)-mercapto-4-fluorotriazin-6-yl, 2-methyl-4-fluorotriazin-6-yl, 2-phenyl-4-fluorotriazin-6-yl and the corresponding 4-chloro- or 4-bromo-triazinyl radicals and the corresponding radicals obtainable by halogen exchange with tertiary bases such as trimethylamine, triethylamine, dimethyl-β-hydroxyethylamine, triethanolamine, N,N-dimethylhydrazine, pyridine or picoline, nicotinic acid or isonicotinic acid, sulphinates, in particular benzenesulphinic acid or hydrogen sulphite.

The halotriazinyl radicals can also be linked to a second halotriazinyl radical or halodiazinyl radical. Examples of such radicals are the following:

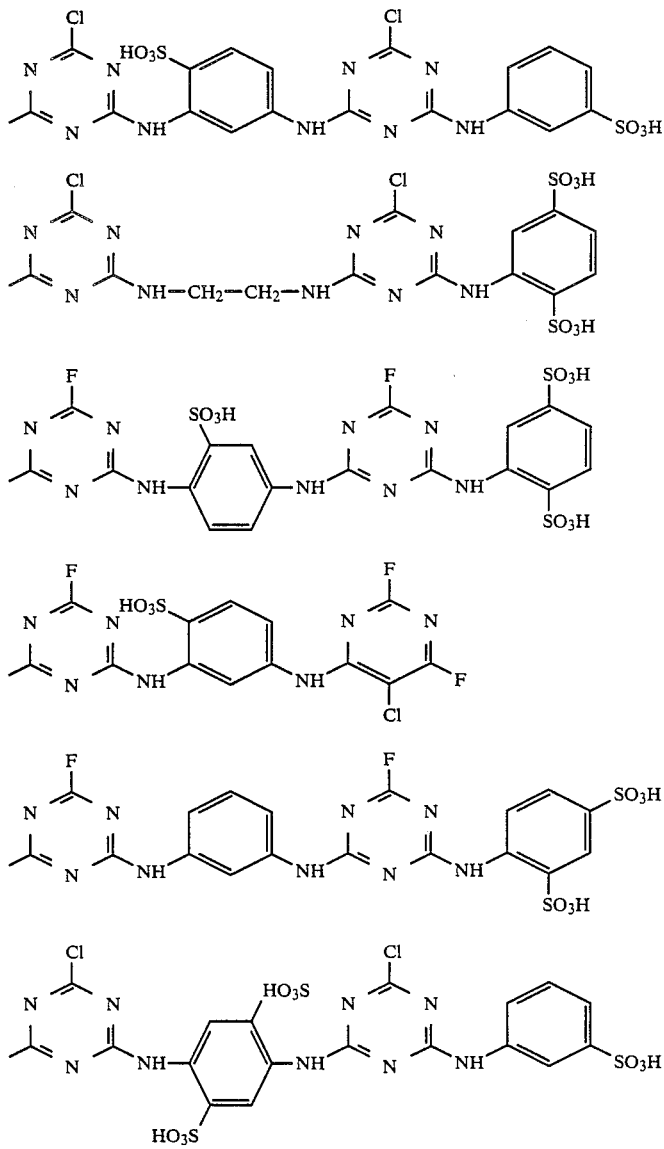

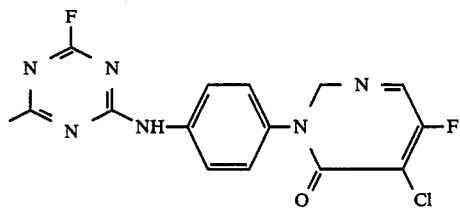
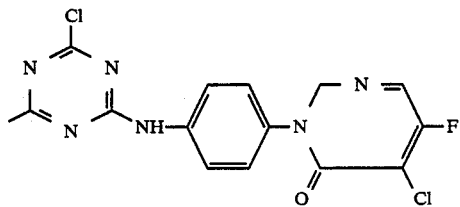
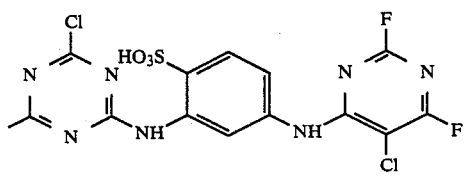
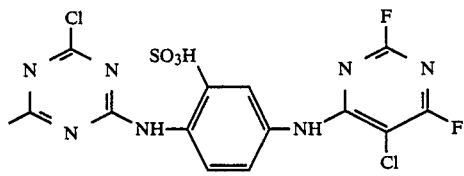
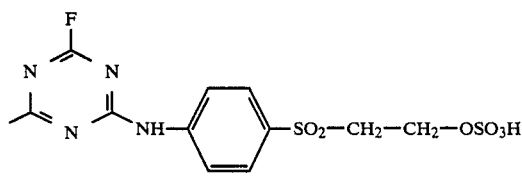
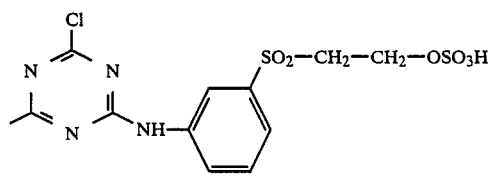
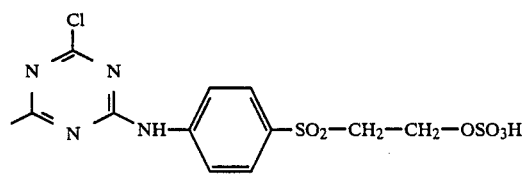
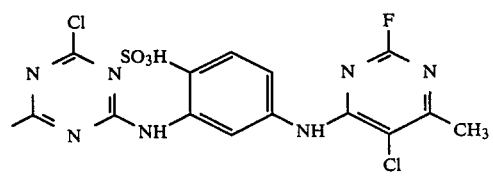
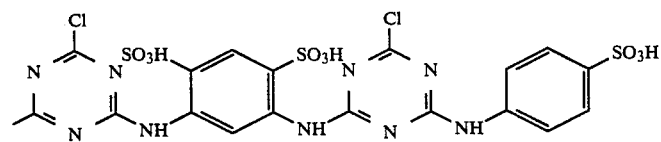

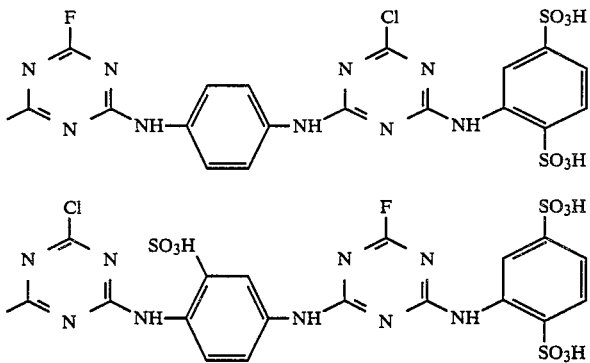

Furthermore, the halotriazinyl radicals can also be linked to an amine radical capable of forming a vinylsulphonyl radical, such as, for example, 2-(2′, 3′- or 4′-(β-sulphatoethylsulphonyl)-phenylamino-4-fluorotriazin-6-yl, 2-(2′-, 3′-, 4′-(β-thiosulphatoethylsulphonyl)-phenylamino)-4-fluorotriazin-6-yl, 2-(2′-, 3′-, 4′-(β-phosphatoethylsulphonyl)-phenylamino)-4-fluorotriazin-6-yl, 2-(2′-, 3′-, 4′-β-acetoxy-ethylsulphonyl)-phenylamino)-4-fluorotriazin-6-yl, 2-(2′-, 3′-, 4′-(β-chloroethylsulphonyl)-phenylamino)-4-fluorotriazin-6-yl, 2-(2′-, 3′-, 4′-vinylsulphonyl-phenylamino)-4-fluorotriazin-6-yl, 2-(2-(β-sulphatoethylsulphonyl)-ethylamino)-4-fluorotriazin-6-yl and the corresponding 2-substituted 4-chlorotriazin-6-yl radicals.

Mono-, di- or trihalopyrimidinyl radicals, such as 2,4-dichloropyrimidin-6-yl, 2,3,5-trichloropyrimidin-6-yl, 2,4-dichloro-5-nitro- or -5-methyl- or -5-carboxymethyl-or -5-carboxy- or -5-cyano- or -5-vinyl- or -5-sulpho-or -5-mono-, -di- or -trichloromethyl- or -5-carboalkoxy-pyrimidin-6-yl, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulphonyl, 2-chloro-quinoxaline-3-carbonyl, 2- or 3-monochloroquinoxaline-6-carbonyl, 2- or 3-monochloroquinoxaline-6-sulphonyl, 2,3-dichloroquinoxaline-6-carbonyl, 2,3-dichloroquinoxaline-6-sulphonyl, 1,4-dichlorophthalazine-6-sulphonyl or -6-carbonyl, 2,4-dichloroquinazoline-7-or -6-sulphonyl or -carbonyl, 2- or 3- or 4-(4′,5′-dichloropyridaz-6′-on-1′-yl)-phenylsulphonyl or -carbonyl, β-(4′,5′-dichloropyridaz-6′-on-1′-yl)-ethylcarbonyl, N-methyl-N-(2,3-dichloroquinoxaline-6-sulphonyl)-aminoacetyl, N-methyl-N-(2,3-dichloroquinoxaline-6-carbonyl)-aminoacetyl, and the corresponding bromine and fluorine derivatives of the abovementioned chlorine-substituted heterocyclic radicals, among which are example 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2-fluoro-5-methyl-6-chloro-4-pyrimidinyl, 2-fluoro-5-nitro-6-chloro-4-pyrimidinyl, 5-brome-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 5-chloro-6-dichloromethyl-2-fluoro-4-pyrimidinyl, 5-chloro-6-trichloromethyl-2-fluoro-4-pyrimidinyl, 5-chloro-2-chloromethyl-6-fluoro-4-pyrimidinyl, 5-chloro-2-dichloromethyl-6-fluoro-4-pyrimidinyl, 5-chloro-2-trichloromethyl-6-fluoro-4-pyrimidinyl, 5-chloro-2-fluorodichloromethyl-6-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or 5-methylsulphonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2-fluoro-4-dichloromethyl-5-chloropyrimidin-6-yl, 2-fluoro-5-chloropyrimidin-4-yl; 2-methyl-4-fluoro-5-methylsulphonylpyrimidin-6-yl; 2,6-difluoro-5-methylsulphonyl-4-pyrimidinyl, 2,6-dichloro-5-methylsulphonyl-4-pyrimidinyl, 2-fluoro-5-sulphonamido-4-pyrimidinyl, 2-fluoro-5-chloro-6-carbomethoxy-4-pyrimidinyl, 2,6-difluoro-5-trifluoromethyl-4-pyrimidinyl; sulphonyl-containing triazine radicals, such as 2,4-bis-(phenylsulphonyl)-triazin-6-yl, 2-(3′-carboxyphenyl)-sulphonyl-4-chlorotriazin-6-yl, 2-(3′-sulphophenyl)-sulphonyl-4-chlorotriazin-6-yl, 2,4-bis-(3′-carboxyphenylsulphonyl)-triazin-6-yl, sulphonyl-containing pyrimidine rings, such as 2-carboxymethylsulphonyl-pyrimidin-4-yl, 2-methylsulphonyl-6-methylpyrimidin-4-yl, 2-methylsulphonyl-6-ethylpyrimidin-4-yl, 2-phenylsulphonyl-5-chloro-6-methyl-pyrimidin-4-yl, 2,6-bis-methylsulphonyl-pyrimidin-4-yl, 2,6-bis-methylsulphonyl-5-chloro-pyrimidin-4-yl, 2,4-bis-methylsulphonyl-pyrimidin-5-sulphonyl, 2-methylsulphonyl-pyrimidin-4-yl, 2-phenylsulphonyl-pyrimidin-4-yl, 2-trichloromethylsulphonyl-6-methyl-pyrimidin-4-yl, 2-methylsulphonyl-5-chloro-6-methyl-pyrimidin-4-yl, 2-methyl-sulphonyl-5-bromo-6-pyrimidin-4-yl, 2-methylsulphonyl-5-chloro-6-ethyl-pyrimidin-4-yl, 2-methylsulphonyl-5-chloro-6-chloromethyl-pyrimidin-4-yl, 2-methylsulphonyl-4-chloro-6-methylpyrimidine-5-sulphonyl, 2-methylsulphonyl-5-nitro-6-methylpyrimidin-4-yl, 2,5,6-tris-methylsulphonyl-pyrimidin-4-yl, 2-methylsulphonyl-5,6-dimethylpyrimidin-4-yl, 2-ethylsulphonyl-5-chloro-6-methylpyrimidin-4-yl, 2-methylsulphonyl-6-chloropyrimidin-4-yl, 2,6-bis-methylsulphonyl-5- chloro-pyrimidin-4-yl, 2-methylsulphonyl-6-carboxypyrimidin-4-yl, 2-methylsulphonyl-5-sulphopyrimidin-4-yl, 2-methylsulphonyl-6-carbomethoxypyrimidin-4-yl, 2-methylsulphonyl-5-carboxypyrimidin-4-yl, 2-methylsulphonyl-5-cyano-6-methoxypyrimidin-4-yl, 2-methylsulphonyl-5-chloropyrimidin-4-yl, 2-sulphoethylsulphonyl-6-methylpyrimidin-4-yl, 2-methylsulphonyl-5-bromopyrimidin-4-yl, 2-phenylsulphonyl-5-chloropyrimidin-4-yl, 2-carboxymethylsulphonyl-5-chloro-6-methylpyrimidin-4-yl, 2-methylsulphonyl-6-chloropyrimidin-4-and -5-carbonyl, 2,6-bis-(methylsulphonyl)-pyrimidine-4- or -5-carbonyl, 2-ethylsulphonyl-6-chloropyrimidine-5-carbonyl, 2,4-bis-(methylsulphonyl)-pyrimidine-5-sulphonyl, 2-methylsulphonyl-4-chloro-6-methylpyrimidine-5-sulphonyl or -carbonyl, 2-chlorobenzothiazole-5- or -6-carbonyl or -5- or -6-sulphonyl, 2-arylsulphonyl- or -alkylsulphonyl-benzothiazole-5- or -6-carbonyl or -5-or -6-sulphonyl, such as 2-methylsulphonyl- or 2-ethylsulphonyl-benzothiazole-5-or -6-sulphonyl or -carbonyl, 2-phenylsulphonylbenzothiazole-5- or -6-sulphonyl or -carbonyl and the corresponding 2-sulphonylbenzothiazole-5-or -6-carbonyl or -sulphonyl derivatives containing sulpho groups in the fused-on benzene ring, 2-chlorobenzoxazole-5-or -6-carbonyl or -sulphonyl, 2-chlorobenzimidazole-5-or -6-carbonyl or -sulphonyl, 2-chloro-1-methylbenzimidazole-5-or -6-carbonyl or -sulphonyl, 2-chloro-4-methyl-1,3-thiazole-5-carbonyl or -4- or -5-sulphonyl, N-oxide of 4-chloro- or 4-nitro-quinoline-5-carbonyl.

Furthermore, reactive groups of the aliphatic series should be mentioned, such as acryloyl, mono-, di- or tri-chloroacryloyl, such as —CO—CH=CH—Cl, —CO—CCl=CH$_2$, —CO—CCl=CH—CH$_3$, —CO—CCl=CH—COOH, —CO—CH=CCl—COOH, β-chloropropionyl, 3-phenylsulphonylpropionyl, 3-methylsulphonylpropionyl, 2-fluoro-2-chloro-3,3-difluorocyclobutane-1-carbonyl, 2,2,3,3-tetrafluorocyclobutane-1-carbonyl or -1-sulphonyl, β-(2,2,3,3-tetrafluorocyclobut-2-yl)-aryloxy, α- or β-bromoacryloyl, α- or β-alkyl- or aryl-sulphoacryloyl groups, such as α- or β-methylsulphonylacryloyl, chloroacetyl, vinylsulphonyl, —SO$_2$CH$_2$CH$_2$Z in which Z=alkali-detachable group, in particular —OSO$_3$H, —OCOCH$_3$, —SSO$_3$H, —OPO$_3$H$_2$, —OCOC$_6$H$_5$, di-C$_1$-C$_4$-alkylamino, quaternary ammonium, in particular —N⊕(C$_1$-C$_4$-alkyl)$_3$X⊖,

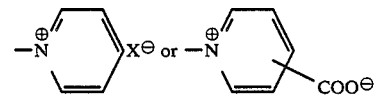

where X=anion or —OSO$_3$H, —OPO$_3$H$_2$, —Cl, —Br, —F, —SCN, —OCN, —OSO$_3$CH$_3$, —OSO$_2$C$_6$H$_5$, OOC—CH$_3$.

Preferred dyestuffs of the formula (I) are those of the formula

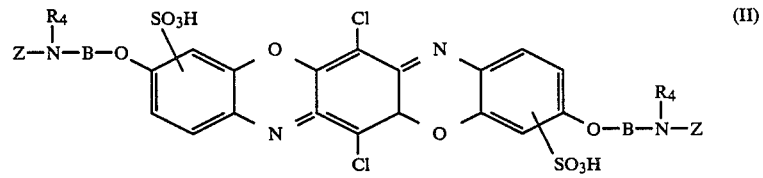

Further preferred dyestuffs are those of the formula

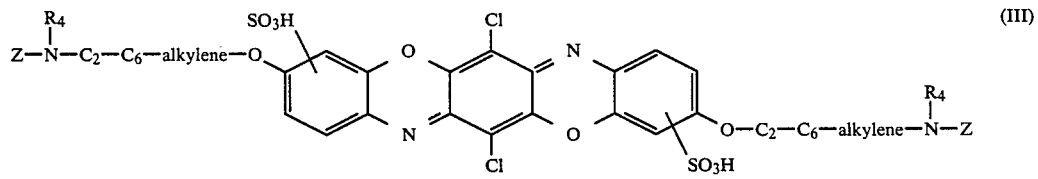

in particular those of the formula

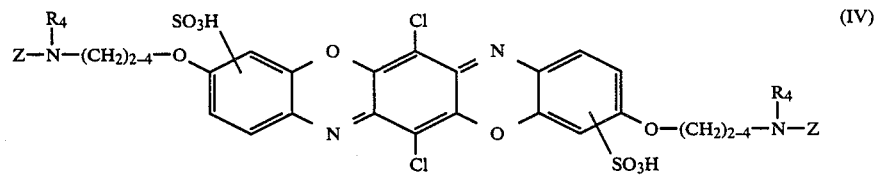

and those of the formula

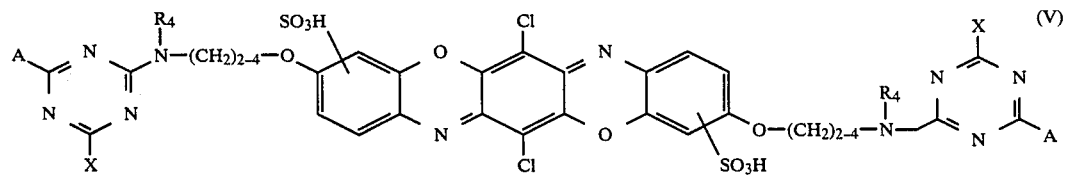

in which
X=F, Cl and
A=radical of an aminobenzene or aminoaphthalene.

The preparation of dyestuffs (I) where Z=fibre-reactive radical is effected, for example, by reacting the corresponding dyestuffs (I) where Z=H (=VI) with 1-2 moles of a reactive component Z-Hal (VII)

in which Hal=F, Cl or Br.

Suitable reactive components (VII) are in particular the halogen compounds underlying the abovementioned radicals.

The condensation is carried out either in an aqueous or aqueous-organic medium depending on the reactive component used at temperatures of 0°-80° C. and pH values of 5-11 in the presence of alkaline condensing agents such as alkali metal hydrogencarbonate, alkali metal carbonate, alkali metal hydroxide, dialkali metal hydrogenphosphate or trialkali metal phosphate solution or in aprotic organic solvents, such as toluene, halobenzenes, nitrobenzene, dimethylformamide, N-methyl-pyrrolidone, tetramethylene sulphone, dimethyl sulphoxide, acetone, methyl ethyl ketone, optionally in the presence of aprotic organic bases such as trialkylamine, N,N-dialkylaniline, pyridine or alkylpyridines at temperatures of 0°-80° C.

A condensation with fewer than 2 moles of (VII) produces mixtures of mono- and bis-condensation product.

The preparation of compounds of the formula (VI) can be effected in accordance with methods known per se by condensing 1,4-benzoquinones of the formula

in which $T_1$ and $T_2$ denote hydrogen, Cl, Br, 0-alkyl or 0-aryl, with amines of the formula

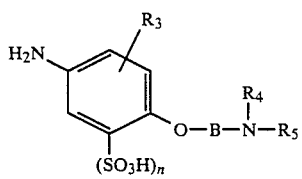

in which
$R_5$=H, alkylcarbonyl or phenylcarbonyl,
n=0 or 1,
or in which

where $X=C_2$–$C_4$-alkylene or 1,2-phenylene, to give compounds of the formula

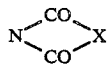

and subsequent ring closure of the dianilides (X) to the triphendioxazine compounds of the formula (VI). Optionally, sulphonic acid groups can be introduced even in the course of this last operation. Furthermore, in addition it is possible, if not done beforehand, to effect a transformation of the

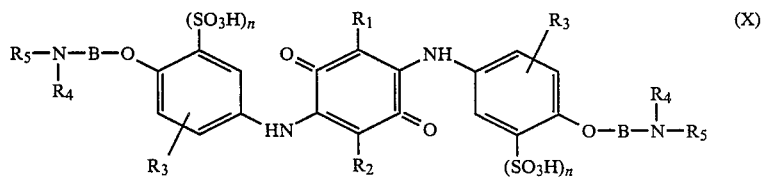

function into

function into

or —NH$_2$ by hydrolysis.

Depending on the reaction conditions employed for ring closure, the sulphonic acid groups in the benzo rings of the dioxazines (VI) can appear either in the o- or in the p-positions relative to the ring oxygen atoms of the dioxazine system.

The condensation of the benzoquinones of the formula (VIII) with the amines (IX) is best effected in an aqueous or aqueous-organic medium in the presence of alkaline condensing agents at pH values of 3-11, preferably 4-8, and temperatures of 20°-90° C., preferably 40°-70° C.,—or in buffered solutions which contain the above alkaline condensing agents. It is also possible to work in a purely organic medium in the presence of acid-binding agents.

Alkaline condensing agents are for example sodium hydrogencarbonate, sodium carbonate, sodium acetate, potassium acetate, sodium hydroxide solution, potassium hydroxide solution, sodium phosphates or sodium borate.

In general, the condensation products of the formula (X) are precipitated as sparingly soluble brown products.

A variant for preparing compounds of the formula (X) consists in the addition of amines (IX) onto 1,4-benzoquinones of the formula

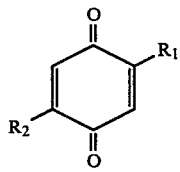 (XI)

in which $R_1$ and $R_2$ have the abovementioned meaning, and oxidation of the adduct intermediates.

The ring closure of the quinone condensation products (X) to the dioxazines (VI) can be effected in accordance with methods known per se, as described in German Offenlegungsschriften 2,122,262, 2,124,080, 2,302,383, 2,344,781, 2,503,611, 2,823,828 and in British patent specification No. 2,019,872, in particular in concentrated sulphuric acid and especially in oleum having $SO_3$ contents of 1–50% at temperatures of 10°–80° C. in the presence or absence of oxidizing agents such as potassium peroxodisulphate, ammonium peroxodisulphate, manganese dioxide or organic peroxides.

Amines (IX) where B=alkylene, preferably $C_2$–$C_6$-alkylene, and n=1 are novel and likewise form part of the subject-matter of the invention and can, for example, be prepared as follows:

nitro compounds of the formulae

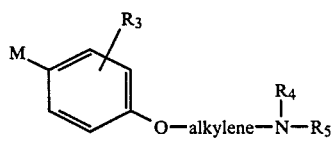

or

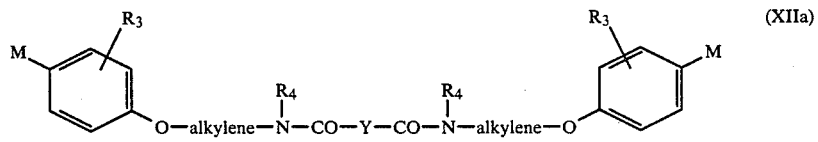

where
Y=direct bond, $C_2$–$C_4$-alkylene or 1,3- or 1,4-phenylene and
M=$NO_2$
are reduced in a known manner to the corresponding amines XIII or XV where M=$NH_2$ and then optionally sulphonated (in the o-position relative to the -o- substituent) and the acylamino group hydrolyzed.

Alternatively, the introduction of sulpho groups can also take place at the stage of compounds (VI) or of stage (X), as well as the hydrolysis.

The preparation of compounds (XIII) can be effected, for example, as follows:

1. 4-Nitrochlorobenzene is reacted with 2-aminoethanol or 2-alkylaminoethanol in dimethyl sulphoxide/sodium hydride at about 40° C. (cf. Knipe et al. Journal of the Chemical Soc., Perkin trans I 1977, 581–584; Synthesis 1976, 606–607).

2. Reaction of ω-(4-nitrophenoxy)-alkanols with toluenesulphonyl chloride to give the corresponding esters, replacement of the toluenesulphonate radical by the phthalimide radical using potassium phthalimide and subsequent acid hydrolysis (cf. J. of Organic Chemistry, 1985, 4449–4504).

3. Reaction of ω-(4-nitrophenoxy)-alkyl bromides with potassium phthalimide or 4-nitrophenol with ω-phthalimido-alkyl bromides and subsequent elimination of the phthalimide radical with hydrazine (cf. British patent specification No. 769,706 and Journal of the Chemical Society (London) 1959, 3886) or reaction of ω-(4-nitrophenoxy)-alkyl bromides with hexamethylenetetramine and subsequent acid hydrolytic cleavage of the quaternary salt (cf. Journal of Medicinal Chemistry, 12, 214–216 (1969).

A significantly simpler process for preparing compounds (XII) or (XIIa) where b=alkylene, which likewise forms part of the subject-matter of the present invention, proceeds as follows.

Nitrohalobenzenes of the formula

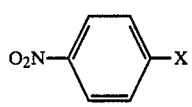 (XVII)

where X=F, Cl or Br are reacted with acylaminoalkanols of the formula

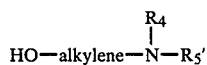 (XVIII)

or

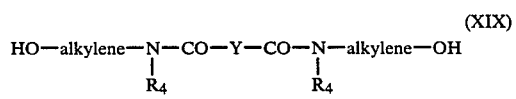 (XIX)

in which
$R_5'$=alkylcarbonyl or arylcarbonyl and in which

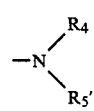

can also stand for

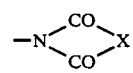

where
X=$C_2$–$C_4$-alkylene or 1,2-phenylene, in the presence of strong bases such as alkali metal hydroxide or organic bases and optionally customary phase transfer catalysts at temperatures of about 20° to 100° C.

The reaction medium used in preferably dipolar aprotic solvents (in combination with solid alkali metal hydroxide or organic bases) or water-immiscible organic solvents (in combination with aqueous alkali metal hydroxide and transfer catalysts).

Suitable dipolar aprotic solvents are for example acetonitrile, dimethyl sulphoxide, tetramethylene sulphone, acid amides such as dimethylformamide, dimethylacetamide, N-methylpyrrolidone.

Suitable organic solvents are for example aromatics such as toluene, xylenes, benzene, chlorobenzenes, nitrobenzene, anisole, dimethylaniline, aliphatic chlorohydrocarbons.

Suitable organic bases are for example trialkylamines such as trimethylamine, tributylamine, N,N-dimethylcyclohexylamine, N-alkylmorpholines, diazabicyclooctane.

Suitable transfer catalysts are for example tetraalkylammonium salts such as tetrabutylammonium chloride or bromide, methyltrioctylammonium chloride, benzyltriethylammonium chloride or bromide, benzyldodecyldimethylammonium chloride, methyl- or ethyltributylammonium bromide, tetra-n-hexylammonium bromide, n-hexadecyl-trimethylammonium bromide.

Suitable acylaminoalkanols of the formulae (XVIII) and (XIX) are for example as follows:

N-(2-hydroxyethyl)-formamide, -acetamide, -propionamide, -benzamide, -4-chlorobenzamide or -phthalimide, N-(3-hydroxy-or 2-hydroxypropyl)-formamide, -acetamide, -propionamide, -butyramide, -benzamide or -phthalimide, N-(4-, 3- or 2-hydroxybutyl)-acetamide or -benzamide, N-(5-hydroxypentyl)-acetamide or -benzamide, N-(6-hydroxyhexyl)-formamide, -acetamide, -propionamide, -benzamide or -phthalimide, N-methyl-N-(2-hydroxyethyl)-acetamide, propionamide or -benzamide, N-ethyl-N-(2-hydroxyethyl)-acetamide or -benzamide, N,N-bis-(2-hydroxyethyl)-acetamide or -benzamide, N-phenyl-N-(2-hydroxyethyl)-acetamide or -benzamide, N-(1-hydroxy-2-propyl)-benzamide, N-cyclohexyl-N-(2-hydroxyethyl)-acetamide, N-ethyl-N-(3-hydroxypropyl)-formamide or -acetamide, N-(2-hydroxy-1,1-dimethylethyl)-acetamide or -benzamide, N-(2-hydroxy-1,2-dimethylethyl)-acetamide or -benzamide, N,N'-bis-(2-hydroxyethyl or 2- or 3-hydroxypropyl or 2-, 3- or 4-hydroxybutyl or 5-hydroxypentyl or 6-hydroxyhexyl)-oxamide, -malonamide or -succinamide or -terephthalamide or -isophthalamide, N-(2-hydroxyethyl, 2- or 3-hydroxypropyl, 2-, 3- or 4-hydroxybutyl)-methylurethane, -ethylurethane or -phenylurethane, N,N-bis-(2-hydroxyethyl)-urea, N,N'-bis-(2- or 3-hydroxypropyl)-urea, N-(2- or 3-hydroxypropyl)-chloroacetamide, N-(2-hydroxyethyl)-acrylamide, N-(2-hydroxyethyl)-methacrylamide.

Compounds (XII) and (XIIa) prepared according to the invention are subsequently reduced to the amines (XIII) and (XV) and subsequently sulphonated in any desired order, and the acylamino group is hydrolyzed to give the compounds of the formula

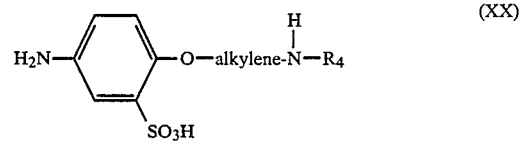

Compounds of the formula (IX) where B=arylene are accessible by conventional methods, for example from nitrohalobenzenes or nitrohalobenzenesulphonic acids and acylaminophenols or acylaminophenolates and subsequent reduction of the nitro groups. Optionally, sulphonic acid groups or further sulphonic acid groups can be introduced by sulphonation.

Specific examples are the following:

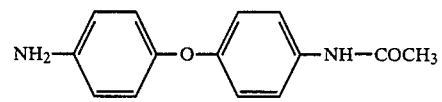

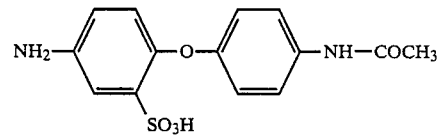

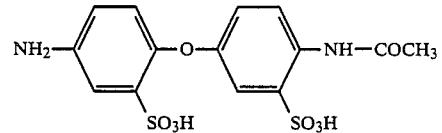

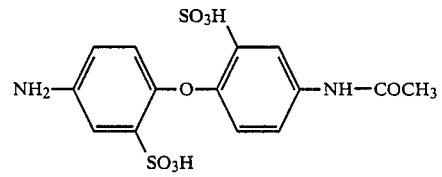

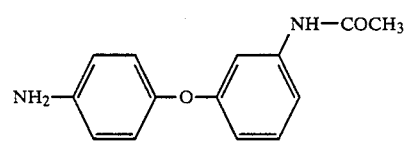

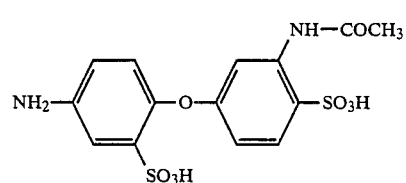

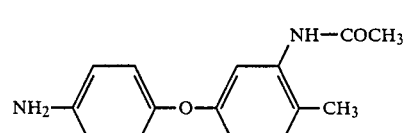

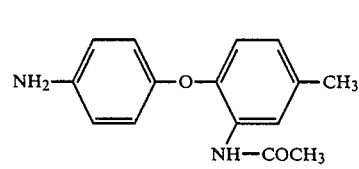

-continued

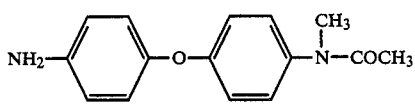

If sulpho-free amines (IX) are used, sulpho groups are optionally introduced during ring closure in oleum or monohydrate to the triphendioxazine.

The novel dyestuffs are useful products which are distinguished by high tinctorial strength. They are suitable in disperse or dissolved form for a very wide range of applications.

As water-soluble compounds they are of preferred interest for dyeing hydroxyl- and amido-containing textile materials, in particular materials made of natural and regenerated cellulose and synthetic polyamide and polyurethane fibres, wool and silk.

As water-soluble reactive dyestuffs, the compounds according to the invention are used for dyeing and printing the materials mentioned by the processes generally customary for reactive dyestuffs. The results are then light- and wet-fast red dyeings and prints.

The temperatures given in the examples are in ° C. The formulae of the water-soluble dyestuffs in the description and in the examples are those of the free acids. The dyestuffs are generally isolated and employed in the form of their alkali metal salts, in particular the lithium, sodium or potassium salts.

EXAMPLE 1

6.5 g of 2-aminobenzenesulphonic acid are dissolved in 80 ml of water at pH 6–7. The pH value is adjusted to 5.0, 3.7 ml of cyanuric fluoride are added dropwise at 0°–5° C. in the course of 5 minutes, and the pH value is maintained at 4.5–4.7 with 5% strength sodium carbonate solution, and some of the condensation product precipitates. To complete the condensation, the batch is subsequently stirred for 15–20 minutes under the above conditions.

7.7 g of an aminoalkoxytriphendioxazine component of the formula (preparation see Example 2)

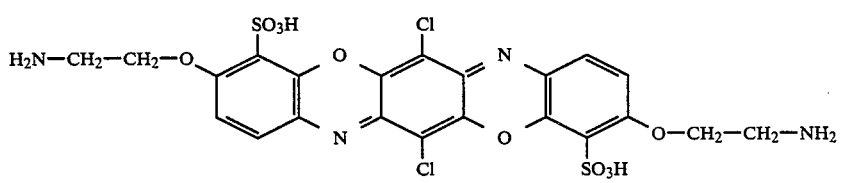

are suspended in 155 ml of water and dissolved with 15.4 ml of 2N sodium hydroxide solution at pH 12 immediately before the reaction.

The solution of the colour component is then added at 0°–5° C. as rapidly as possible to the suspension of the reactive component prepared above in such a way that a pH value of 8.5–9.0 becomes established, and that pH value is maintained by the dropwise addition of 2N sodium hydroxide solution to the reaction mixture.

This is followed by stirring at 0°–5° C. for some hours with constant pH control, and the temperature is then allowed to rise overnight with continued pH control and addition of sodium hydroxide solution to 20° C. After setting a pH value of 7.5–8.0, the dyestuff is salted out with about 50 g of sodium chloride, the precipitate is filtered off with suction, and the filtercake is washed with 300 ml of 15% strength sodium chloride solution.

After the addition of phosphate buffers, the filtercake is dried at 50° C. in a vacuum drying cabinet. The dyestuff obtained conforms to the formula

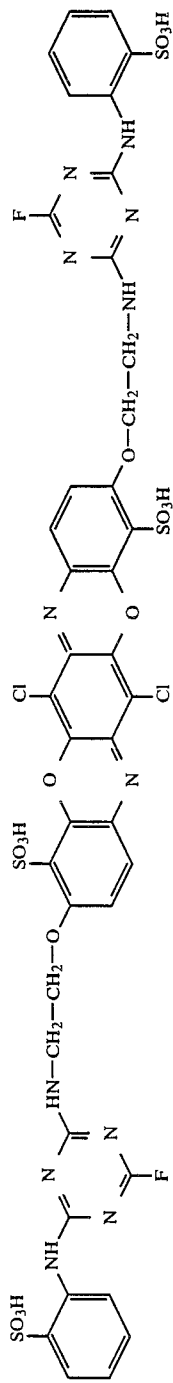

and dyes cellulose fibres in accordance with the dyeing processes known for reactive dyestuffs in light-fast deep bluish red shades.

$\lambda_{max}$=545 nm, 511 nm in water.

EXAMPLE 2

50.0 g of 2-(4-amino-2-sulphophenoxy)-ethylamine hydrochloride (preparation see Examples 3-6) are suspended in 500 ml of water and made to dissolve by adding 2N sodium hydroxide solution up to pH 5.5. After addition of 80 ml of isopropanol, 23.1 g of 2,3,5,6-tetrachloroquinone are added, and the reaction mixture is heated to 40° C. By adding 2N sodium carbonate solution the pH value is constantly maintained at 5.5, and stirring is continued to complete the condensation until the consumption of sodium carbonate has completely ceased. After the reaction has ended, the brown suspension of the condensation product is filtered off with suction, and the filtercake is washed with 500 ml of water and 500 ml of acetone. Drying leaves 52.8 g of a product of the formula

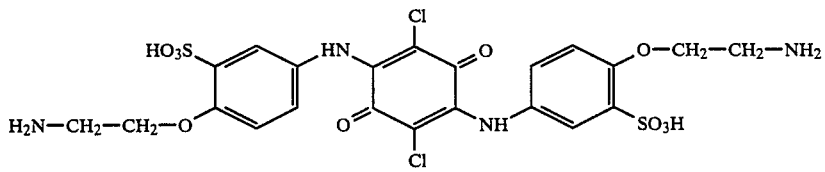

50.0 g of the condensation product obtained are gradually introduced into 200 ml of 20% strength oleum at 0°-10° in the course of 3 hours, the temperature is raised to 25° C., and 42.4 g of potassium peroxodisulphate are then added in about 1 hour, during which the temperature is maintained at 30°-35°. After the oxidizing agent has been added, the reaction mixture is maintained at 30° C. for 30 minutes and subsequently stirred into 2,000 g of ice. The suspension formed is filtered off with suction at 20°, and the filter material is washed with water until neutral or sulphate-free.

EXAMPLE 3

90.4 g of 2-benzoylaminoethanol are dissolved at 15° in 360 ml of acetonitrile. 30.1 g of pulverized potassium hydroxide are added to the solution and 68.3 g of 1-fluoro-4-nitrobenzene are added dropwise with slight cooling to the suspension in the course of 20-30 minutes in such a way that the temperature is maintained at 25°-30°. Stirring is thereafter continued at 30° for 3 hours until the reaction is complete. The batch is diluted with 1,700 ml of water, the precipitate is filtered off with suction, and the filtercake is washed with 2 l of water. 128.5 g of product of the formula

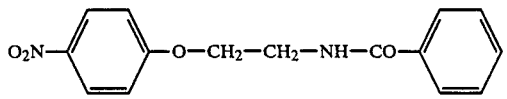

are obtained with a melting point of 147°-148° (yellowish plates from toluene).

Elemental analysis: calculated C 62.91%, H 4.93%, N 9.79%, O 22.37%. found C 63.10%, H 5.05%, N 9.80%, O 22.00%.

$^1$H-NMR (DMSO): $\delta$=3.66–3.72 ppm (2H,q), $\delta$=7.85 (2H, d), $\delta$=4.28 ppm (2H, t), $\delta$=8.17 (2H, d), $\delta$7.16 ppm (2H, d), $\delta$=8.71 (1H, t), $\delta$=7.4–7.55 ppm (3H, m).

128.5 g of the above nitroalkoxy compound are reduced at 50°-60° in 450 ml of methanol in an autoclave in the presence of 5 g of Raney nickel under a hydrogen pressure of 50 bar. After the absorption of hydrogen has ceased, the mixture is diluted with 150 ml of methanol, the Raney nickel is filtered off hot, and after the nickel has been washed with methanol the combined filtrates are evaporated to dryness. This leaves 113.5 g of crystalline N-[2-(4-aminophenoxy)-ethyl]-benzamide. Melting point 115°-117° (from isopropanol or toluene)

$^1$H-NMR (DMSO): $\delta$=3.57–3.64 (2H, q), $\delta$=6.68 (2H, d), $\delta$=8.64 (1H, t), $\delta$=3.99 (2H, t), $\delta$7.42–7.51 (3H, m), $\delta$=6.51 (2H, d), $\delta$=7.86 (2H, d).

113.5 g of the above aminophenoxyethylbenzamide are added at 15°-20° to a mixture of 228 ml of 20% strength oleum and 114 ml of 96% strength sulphuric acid in the course of 45 minutes; the temperature is raised to 25°, and the progress of the sulphonation is monitored by chromatography. When the reaction has ended after about 2½ hours, the solution is stirred into 2 kg of ice. After further stirring for half an hour, the crystalline sulphonic acid is filtered off with suction and washed with 1.5 l of cold 2% strength hydrochloric acid until sulphate-free. The product obtained can be dried in a circulating air cabinet at 60° and then gives 149.8 g of product. To hydrolyze the benzoylamino function, the product obtained is boiled under reflux in 1,500 ml of 10% strength hydrochloric acid for several hours, during which the initial suspension gradually dissolves. After stirring until cold, the product crystallizes out in the form of attractive needles. They are filtered off with suction, and the coprecipitated benzoic acid is removed by washing the filtercake with methanol or acetone. Drying leaves 96.0 g of a hydrochloride of the following formula

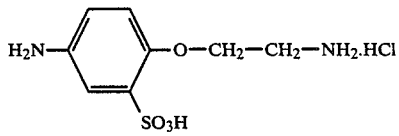

$^1$H-NMR $\delta$=3.68 ppm (2H, t) calculated 13.59% HCl $\delta$=4.28 ppm (2H, t) found 13.48% HCl $\delta$=7.35 ppm (1H, d) $\delta$=7.61−7.64 (1H, m) $\delta$=7.86 ppm (1H, d)

EXAMPLE 4

45 g of 2-acetylaminoethanol are dissolved in 170 ml of acetonitrile, and 24.0 g of pulverulent potassium hydroxide are added, whereupon a crystalline precipitate of the alcoholate forms. 54.2 g of 4-nitrofluorobenzene are added dropwise to the suspension at 30° in the course of 30 minutes, and the temperature is then raised to 40°. A yellow solution forms. After 5 hours at 40° the batch is poured onto 2 l of water, the reaction product which initially precipitates in the form of an oil gradually solidifies into an acicular mass of crystals. The product is filtered off with suction, washed with water and dried. It conforms to the formula

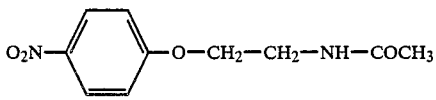

Melting point 120°-122° (from toluene). δ=1.96 (3H, s), δ=6.28 ppm (broad, 1H), δ=3.61-3.68 ppm (2H, q), δ=6.90-6.95 ppm (2H, m), δ=4.16 ppm (2H, t), δ=8.08-8.14 (2H, m).

55 g of the above nitro compound are dissolved in 250 ml of methanol. 2 g of Raney nickel are added to the solution in an autoclave, 80 bar of hydrogen pressure is injected, and after the heat of reaction has died down the temperature is increased to 50°. After the absorption of hydrogen has ceased, the solution is freed from the Raney nickel, and the filtrate is evaporated in a rotary evaporator to give a brownish crystalline residue of the following compound

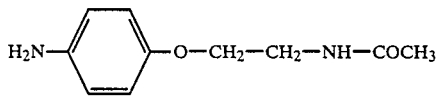

Melting point 96°-97° (from toluene).
$^1$H-NMR (CD$_2$Cl$_2$): δ=1.97 ppm (3H, s), δ=6.36 ppm (broad, 1H), δ=3.59 ppm (2H, q), δ=6.64 ppm (2H, m), δ=3.97 ppm (2H, t), δ=6.76 ppm (2H, m).

30.0 g of N-2-(4-aminophenoxy)-ethylacetamide are added at 10°-20° to 36 ml of 20% strength oleum and 18 ml of 96% strength sulphuric acid. This is followed by stirring at 20° for 2 hours until a chromatographic sample indicates complete sulphonation. The oleum solution is added to 410 ml of water, and the solution obtained is heated under reflux for 3 hours for the purpose of hydrolysis. After the solution has cooled down, 85 g of sodium chloride are added to precipitate fine needles. The precipitate is filtered off with suction and washed with 25% strength sodium chloride solution. The product conforms in the form of the free acid to the formula

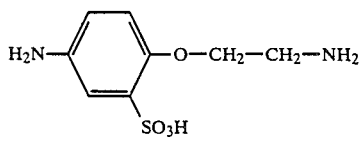

and is identical to that of Example 3.

EXAMPLE 5

25.0 g of N,N'-bis-(2-hydroxyethyl)-oxamide are dissolved in 120 ml of dimethyl sulphoxide. 16 g of pulverulent potassium hydroxide are added to give a mass of crystals, to which 40.0 g of 4-nitrofluorobenzene are added dropwise in the course of 15 minutes. The temperature is allowed to rise to 40°, and the batch is maintained within that temperature range by slight cooling. After the exothermic reaction has died down, the reaction mixture is heated at 40° for a further 8 hours. A thick yellowish suspension forms. It is stirred into methanol, and the product is filtered off with suction and washed with methanol and water. Drying leaves a product of the formula.

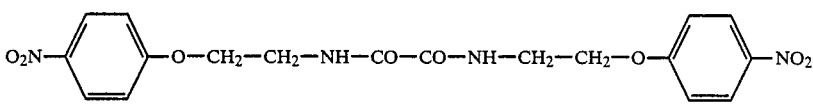

which, dissolved in 10 parts of pyridine and precipitated when hot with 3.3 parts of water, crystallizes to form attractive needles having a melting point of 189°-190°. Mass spectrum (chemical ionization) M+H$^+$ =419

$^1$H-NMR (DMSO): δ=3.53-3.60 ppm (2×2H, q) δ=4.22 ppm (2×2H, t), δ=7.10 ppm (2×2H, m), δ=8.13 ppm (2×2H, m), δ=8.93 ppm (2×1H, 1).

40.0 g of the above nitrophenoxyoxamide are put under 80 bar of hydrogen pressure in 400 ml of methanol in an autoclave in the presence of 2 g of Raney nickel. The autoclave is heated to 70° in the course of one hour and that temperature is maintained for some time until no more hydrogen is absorbed. The precipitated diamino compound is then separated from the nickel by leaching out with 1:1 methanol-water, and the compound of the formula

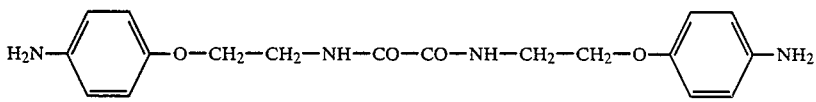

which precipitates in the filtrate in the form of white crystals is filtered off with suction and dried. Melting point 192°-193° (from pyridine).

$^1$H-NMR (DMSO) δ=3.38-3.46 ppm (2×2H, q), δ=6.43 ppm (2×2H, d), δ=3.86 ppm (2×2H, t), δ=6.59 ppm (2×2H, d), δ=4.56 ppm (2×2H, s), δ==8.76 ppm (2×1H, t).

In place of methanol the hydrogenation can also be carried out in glycol monomethyl ether as the solvent and, after removal of the nickel by filtration, the product is isolated by precipitation with water or by concentrating.

24.8 g of the above aminophenoxyoxamide are added to 48 ml of 20% strength oleum and 24 ml of 96% strength sulphuric acid at 10°-15° in the course of 30 minutes. This is followed by 3 hours of stirring at 20°, and chromatographic samples are taken to ensure that the disulphonation has gone to completion. The solution is then poured into 560 ml of water to form a coarsely crystalline suspension of the compound

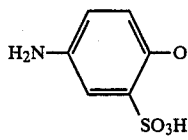 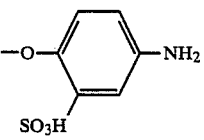

Filtering off with suction, washing with water and drying gives 36.0 g.

30.8 of the disulphonic acid obtained are boiled under reflux in 175 ml of 2N sodium hydroxide solution for 45 minutes until starting material and monohydrolysis product (oxamidic acid) are not longer detectable by chromatography. 105 ml of 37% strength hydrochloric acid are then added to the hot mixture, and the solution is allowed to cool down with stirring. Crystals form of the resulting compound of the formula

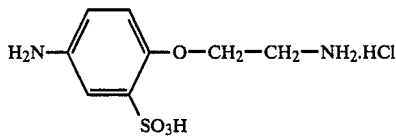

which is identical to that of Example 3, the attractive needles.

EXAMPLE 6

20.0 g of 2-benzoylaminoethanol are suspended in 60 ml of chlorobenzene. To the suspension are added 9.7 g of 50% strength sodium hydroxide solution and stirred in for some time until a homogeneous syrup has formed. 1.5 g of tetrabutylammonium bromide are then added, followed dropwise in the course of 15 minutes by 14.3 g of 4-nitrofluorobenzene, and the temperature rises to about 28°-30° C. The yellowish suspension is stirred at 30° for 3 hours and at 45° for a further 5 hours until the conversion of the nitrofluorobenzene is complete. Water is then added to the reaction mixture, the pH value is brought to 5 and the chlorobenzene is driven off in vacuo with water, leaving behind a slightly yellow suspension. After cooling down, it is filtered, and the filtercake is washed with water to give N-[2-(4-nitrophenoxy)-ethyl]-benzamide of Example 3:

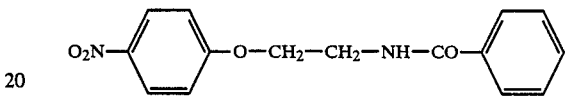

Products of the general formula

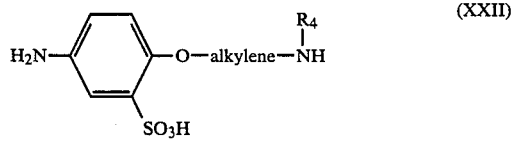

can be obtained by using the procedure of Examples 3 to 6 to react, not the 2-acylaminoethanols used there, but the acylaminoalkanols listed in Table I with 4-nitrofluorobenzene to corresponding acylated 4-nitrophenoxyalkylamines, reducing these to the amino compounds and subsequently effecting sulphonation and hydrolysis in any desired order.

TABLE 1

| | | Compound of the formula (XXII) | |
|---|---|---|---|
| No. | Acylaminoalkanol | Alkylene | R$_4$ |
| 1 | N—(2-hydroxyethyl)-formamide | —CH$_2$—CH$_2$— | H |
| 2 | N—(2-hydroxyethyl)-propionamide | " | H |
| 3 | N—(2-hydroxyethyl)-4-chlorobenzamide | " | H |
| 4 | N—(2-hydroxyethyl)-phthalimide | " | H |
| 5 | N—(3-hydroxypropyl)-acetamide | —CH$_2$—CH$_2$—CH$_2$ | H |
| 6 | N—(3-hydroxypropyl)-benzamide | " | H |
| 7 | N—(3-hydroxypropyl)-phthalimide | " | H |
| 8 | N—(2-hydroxypropyl)-acetamide | —CH$_2$—CH(CH$_3$)— | H |
| 9 | N—(2-hydroxypropyl)-benzamide | " | H |
| 10 | N—(4-hydroxybutyl)-acetamide | —(CH$_2$)$_4$— | H |
| 11 | N—(4-hydroxybutyl)-benzamide | " | H |
| 12 | N—(4-hydroxybutyl)-acetamide | " | H |
| 13 | N—(3-hydroxybutyl)-acetamide | —CH$_2$—CH$_2$—CH(CH$_3$)— | H |
| 14 | N—(2-hydroxybutyl)-benzamide | —CH$_2$—CH(C$_2$H$_5$)— | H |
| 15 | N—(5-hydroxypentyl)-acetamide | —(CH$_2$)$_5$— | H |
| 16 | N—(5-hydroxypentyl)-benzamide | " | H |
| 17 | N—(6-hydroxyhexyl)-benzamide | —(CH$_2$)$_6$— | H |
| 18 | N—methyl-N—(2-hydroxyethyl)-acetamide | —CH$_2$—CH$_2$— | CH$_3$ |
| 19 | N—methyl-N—(2-hydroxyethyl)-benzamide | " | CH$_3$ |
| 20 | N—ethyl-N—(2-hydroxyethyl)-acetamide | —CH$_2$—CH$_2$— | C$_2$H$_5$ |
| 21 | N,N-bis-(2-hydroxyethyl)-benzamide | —CH$_2$—CH$_2$— | CH$_2$—CH$_2$OH |
| 22 | N—phenyl-N—(2-hydroxyethyl)-acetamide | —CH$_2$—CH$_2$— | |
| 23 | N—cyclohexyl-N—(2-hydroxyethyl)-acetamide | —CH$_2$—CH$_2$— | |
| 24 | N—methyl-N—(3-hydroxypropyl)-acetamide | —CH$_2$—CH$_2$—CH$_2$— | CH$_3$ |
| 25 | N—ethyl-N—(3-hydroxypropyl)-benzamide | —CH$_2$—CH$_2$—CH$_2$— | C$_2$H$_5$ |
| 26 | N—methyl-N—(2-hydroxypropyl)-acetamide | —CH$_2$—CH(CH$_3$)— | CH$_3$ |
| 27 | N,N'—bis-(2-hydroxyethyl)-oxamide | —CH$_2$—CH$_2$— | H |
| 28 | N,N'—bis-(3-hydroxypropyl)-oxamide | —CH$_2$—CH$_2$—CH$_2$— | H |
| 29 | N,N'—bis-(2-hydroxypropyl)-oxamide | —CH$_2$—CH(CH$_3$)— | H |
| 30 | N,N'—bis-(4-hydroxybutyl)-oxamide | —(CH$_2$)$_4$— | H |
| 31 | N,N'—bis-(3-hydroxybutyl)-oxamide | —CH$_2$—CH$_2$—CH(CH$_3$)— | H |
| 32 | N,N'—bis-(2-hydroxyethyl)-terephthalamide | —CH$_2$—CH$_2$— | H |

TABLE 1-continued

| No. | Acylaminoalkanol | Compound of the formula (XXII) Alkylene | $R_4$ |
|---|---|---|---|
| 33 | N,N'—bis-(3-hydroxypropyl)-terephthalamide | —$CH_2$—$CH_2$—$CH_2$— | H |
| 34 | N,N'—bis-(2-hydroxyethyl)-isophthalamide | —$CH_2$—$CH_2$— | H |
| 35 | N,N'—bis-(2-hydroxyethyl)-succinamide | —$CH_2$—$CH_2$— | H |
| 36 | N—(2-hydroxyethyl)-methylurethane | " | H |
| 37 | N—(3-hydroxypropyl)-ethylurethane | —$CH_2$—$CH_2$—$CH_2$— | H |
| 38 | N—(2-hydroxyethyl)-phenylurethane | —$CH_2$—$CH_2$— | H |
| 39 | N—(3-hydroxy-2-propyl)-acetamide | —$CH(CH_3)$—$CH_2$— | H |
| 40 | N—(2-hydroxy-1,2-dimethyl-ethyl)-acetamide | —$CH(CH_3)$—$CH(CH_3)$— | |
| 41 | N—(2-hydroxy-1,1-dimethyl-ethyl)-acetamide | —$C(CH_3)_2$—$CH_2$— | H |
| 42 | N—[2-(2-hydroxyethoxy)-ethyl]-acetamide | —$C_2H_4$—O—$C_2H_4$— | H |
| 43 | N—(2-hydroxyethyl)-butyramide | —$CH_2$—$CH_2$— | H |
| 44 | N—methyl-N—(2-hydroxyethyl)-butyramide | —$CH_2$—$CH_2$— | $CH_3$ |
| 45 | N—(3-hydroxypropyl)-2-ethyl-butyramide | —$CH_2$—$CH(C_2H_5)$—$CH_2$— | H |
| 46 | N—(3-hydroxyethyl)-2-ethyl-butyramide | " | H |
| 47 | N—(2-hydroxyethyl)-stearamide | —$CH_2$—$CH_2$— | H |
| 48 | N,N'—bis-(2-hydroxyethyl)-urea | " | H |

EXAMPLE 7

9.5 g of 2-aminobenzene-1,4-disulphonic acid are dissolved in 50 ml of water by the dropwise addition of 10% strength sodium carbonate solution and setting a pH value of 5.5. After the solution has cooled down, 3.8 ml of cyanuric fluoride are added dropwise at 0°-5° C. in the course of 5 minutes, the pH value is maintained at 4.5-4.7 by means of 10% strength sodium carbonate solution, and the complete the condensation stirring is continued for a further 20 minutes under the stated conditions.

7.7 g of aminoalkoxytriphendioxazine component from Example 2 are suspended in 160 ml of water and dissolved at pH 12 by means of 15.4 ml of 2N sodium hydroxide solution.

The solutions of the reactive component and of the chromophoric component respectively are then simultaneously added dropwise at 0°-5° C. to 50 ml of previously introduced water at such a rate that a pH value of 8.5 becomes established in the reaction mixture and the two solutions have been added at the same time in the course of about 15 minutes.

To be able to maintain the stated pH value during the dropwise addition of the solutions, additional 2N sodium hydroxide solution needs to be metered into the reaction mixture.

The resulting red solution is maintained at pH 8.5 by means of 2N sodium hydroxide solution at 0°-5° for some hours until the condensation has ended. The temperature is then allowed to rise overnight to 20° with constant pH control, the pH value is then set to 7.5, and the dyestuff is salted out by adding about 20% of potassium chloride. The precipitate is filtered off with suction, and washed with 15°-20% strength potassium chloride solution, and the filtercake is pasted up with phosphate buffer and dried in vacuo at 50°. The dyestuff obtained conforms to the formula

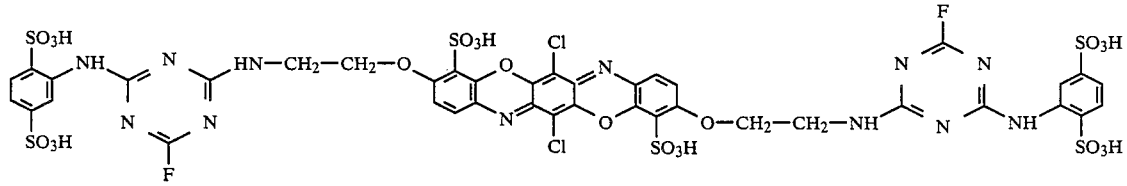

It dyes cellulose fibres by the dyeing methods known for reactive dyestuffs in light-fast deep bluish red shades.

$\lambda_{max}$=540 nm, 507 nm in water.

EXAMPLE 8

6.5 g of 3-aminobenzenesulphonic acid are suspended in 20 ml of water. 0.1 g of sodium fluoride is added to the suspension, followed dropwise at 0°-5° by 3.35 ml of cyanuric fluoride, while the pH value in the reaction mixture is maintained at 3.5 with 2N sodium carbonate solution. The result is a clear solution.

7.7 g of aminoalkoxytriphendioxazine component from Example 2 are dissolved in 155 ml of water at pH 12 by adding 15.4 ml of 2N sodium hydroxide solution.

The solutions of the reactive component and of the colour base are added dropwise at 0°-5° to 50 ml of previously introduced water at such a rate that a pH value of 8.5-8.7 becomes established in the reaction mixture and the two solutions have been added at the same time in the course of about 10 minutes. During this operation the pH value in the reaction mixture is maintained by adding further 2N sodium hydroxide solution.

The resulting suspension is maintained at 0°-5° for some further hours, and then the temperature is allowed to rise to 20° with continued constant pH control. The dyestuff obtained is salted out completely by adding salt, filtered off with suction and washed with 10% strength sodium chloride solution. After pasting up with phosphate buffer of pH 6.5, the dyestuff is dried at 55° in a circulating air cabinet.

The dyestuff obtained conforms to the formula

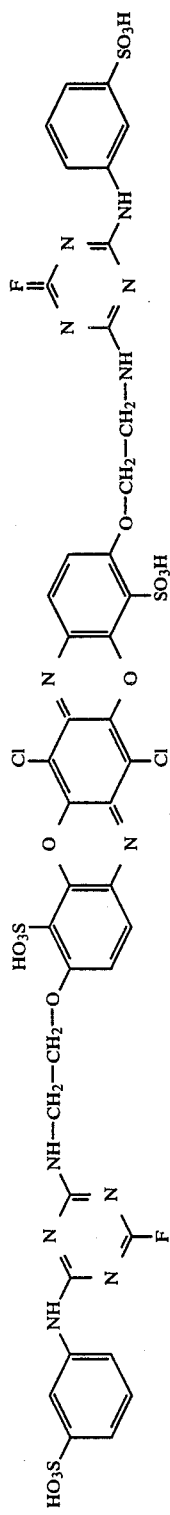

It dyes cellulose fibres from a long liquor in light-fast very deep bluish red shades.

$\lambda_{max}=545$ nm, 512 nm in water.

EXAMPLE 9

10.0 g of bis-β-aminoethoxytriphendioxazine component from Example 2 are dissolved in 250 ml of water by the dropwise addition of 2N sodium hydroxide solution up to pH 12. 4.6 ml of 2,4,6-trifluoro-5-chloropyrimidine are dissolved in 50 ml of acetone. The two solutions are simultaneously added dropwise at 20° to a mixture of 100 ml of water and 50 ml of acetone in the course of 15 minutes at such a rate that the two solutions arrive in the reaction mixture at proportionally the same rate, and the pH value in the reaction mixture is maintained at 8.5–9.0 by means of 2N sodium hydroxide solution. After the reaction has ended and no further sodium hydroxide consumption takes place, 10% strength sodium chloride solution is added to the reaction mixture until all the dyestuff has precipitated, the precipitate is filtered off with suction, and the filtercake is washed with dilute sodium chloride solution.

Drying at 55° in a circulating air cabinet leaves, in the form of a powder, the dyestuff of the formula which dyes cellulose fibres and wool by the customary dyeing techniques in light-fast and wet-fast bluish red shades.

$\lambda_{max}=538$ nm in water.

EXAMPLE 10

6.5 g of 3-aminobenzenesulphonic acid are dissolved in 80 ml of water as described in Example 8 and reacted with 3.7 ml of cyanuric fluoride at 0°–5° and pH 3.5 to give the reactive component.

8.1 g of an aminopropoxytriphendioxazine component of the formula

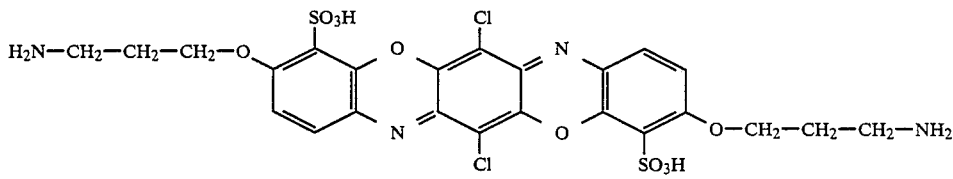

prepared by condensing chloranil with the amine component of Example 6, Table 1, No. 5 or 6, and subsequent oxidative ring closure in accordance with the teaching of Example 2 or in the manner of Example 11, are dissolved in 160 ml of water at pH 12 with 2N sodium hydroxide solution.

The two solutions are then made to react by simultaneous dropwise addition to water at 0°–5° and pH 8.5–8.7, the pH value in the reaction mixture being maintained by adding 2N sodium hydroxide solution. After subsequently stirring for several hours with pH control, the temperature is allowed to rise to 20°, and the dyestuff is isolated by salting out, filtration and washing with sodium chloride solution. The dyestuff conforms to the formula

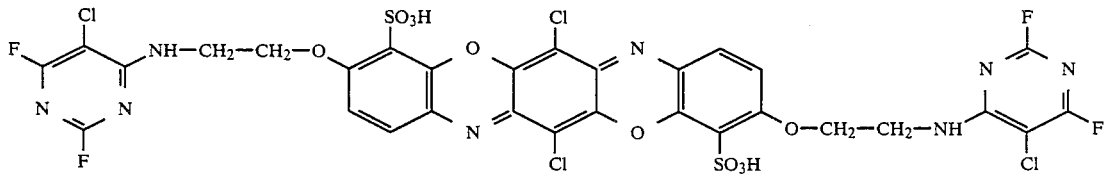

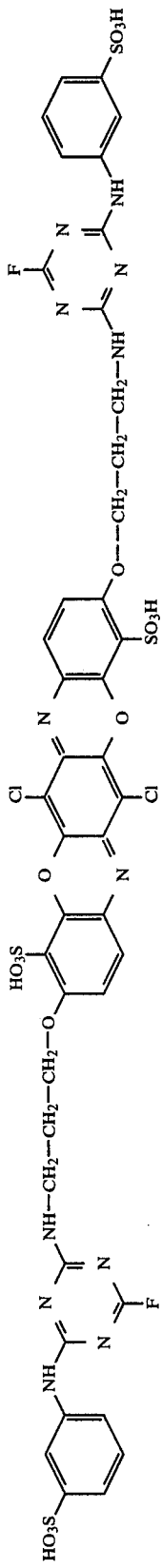

It dyes cellulose fibres from a long liquor in light-fast very deep bluish red shades.

$\lambda_{max} = 544$ nm, 511 nm in water.

EXAMPLE 11

46.5 g of 3-(4-aminophenoxy)-propylamine hydrochloride are dissolved in 465 ml of water. pH 6.0 is set, 24.6 g of 2,3,5,6-tetrachloroquinone and 80 ml of methanol are added, and the batch is heated to 40°. During the time the pH value is maintained at a constant 6.0–5.8 with 2N sodium carbonated solution. After the reaction has ended, the precipitated product is filtered off with suction, washed with water and dried. It conforms to the formula

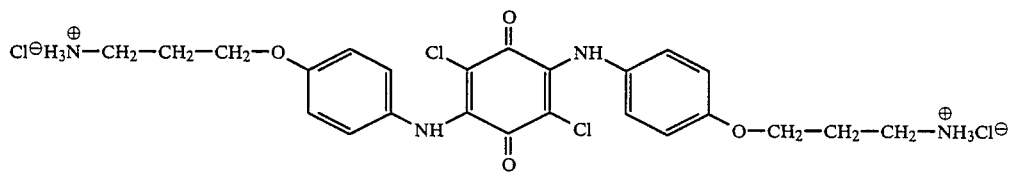

30.0 g of the condensation product obtained are added at 0°–10° to 120 ml of 20% strength oleum in the course of 3 hours. If necessary, the batch is subsequently stirred at 20° until a chromatogram indicates the introduction of one sulphonic acid group each per aromatic ring.

The temperature is raised to 25°, and 25.4 g of potassium peroxodisulphate are added in the course of 1 hour, and the temperature is allowed to rise to 30°–35° and is maintained at 30° for a further 30 minutes after addition of the oxidizing agent. After the reaction has ended the solution is stirred into 1,200 g of ice, and the precipitated product is filtered off with suction and freed from sulphuric acid by washing with water.

The product corresponds in terms of formula to the bis-aminopropoxytriphendioxazinedisulphonic acid used at the beginning of Example 10.

EXAMPLE 12

14.0 g of cyanuric chloride are dissolved in 80 ml of acetone, and the solution is poured onto 80 g of ice. To the suspension is then added at 0°–5°, dropwise, a neutralized solution of 6.5 g of 3-aminobenzenesulphonic acid and 6.5 g of 4-aminobenzenesulphonic acid in 120 ml of water in the course of 1 hour, and in the reaction mixture the pH value is maintaind at 4.0–4.5 with 2N sodium carbonate solution. After the reaction has ended, the solution is clarified.

19.8 g of bis 2-aminoethoxytriphendioxazine component of Example 2 are dissolved in 380 ml of water at pH 12 with 39.6 ml of 2N sodium hydroxide solution.

The solutions of the reactive component and of the chromophoric component are added simultaneously dropwise to 100 ml of previously introduced water at such a rate that a pH value of 8.5 becomes established in the reaction mixture and the two solutions have been added in 15–30 minutes. In the reaction mixture the pH value is maintained at 8.5 with 2N sodium hydroxide solution, and the condensation is completed at that pH value. Sodium chloride is added to the solution obtained to salt out the dyestuff, and the precipitate is filtered off with suction and washed with 20% strength sodium chloride solution. Drying leaves a dyestuff which conforms to the formula

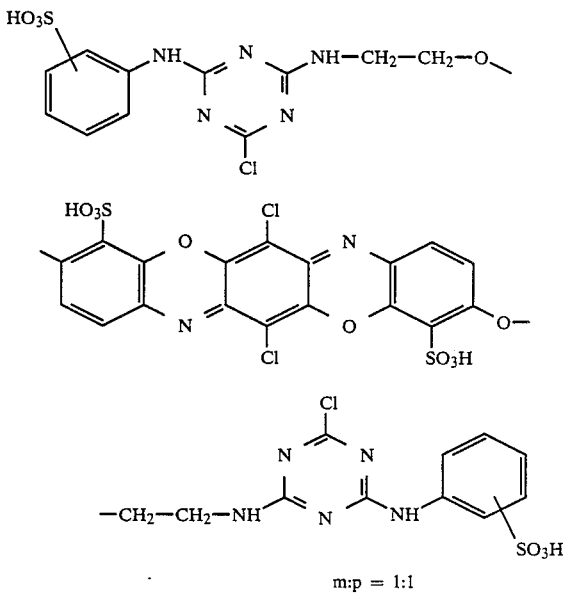

m:p = 1:1 and dyes cellulose fibres in light-fast deep bluish red shades.

$\lambda_{max} = 544$, 511 nm in water.

Further reactive dyestuffs of the general formula (I) which dye cellulose fibres red are obtained when the bis-aminoalkoxytriphendioxazine colour bases listed in Table II in column 2 are condensed with the reactive components of column 3.

TABLE II

| Example | Triphendioxazine component | Reactive component |
|---|---|---|
| 13 | [structure] | [structure] |
| 14 | " | [structure] |
| 15 | " | [structure] |
| 16 | [structure] | [structure] |
| 17 | " | [structure] |
| 18 | " | [structure] |

TABLE II-continued

| Example | Triphendioxazine component | Reactive component |
|---|---|---|
| 19 | [structure with H2N-CH2-CH2-O- and -O-CH2-CH2-NH2 substituents, SO3H groups, Cl atoms] | 1. [dichlorotriazine with NH-phenyl-2,5-(SO3H)2] |
| 20 | " | 2. [pyridine-3-COOH] |
|  | $\lambda_{max}$ = 541 nm, 508 nm in water | |
| 21 | " | [difluorotriazine with NH-phenyl-2,4-(SO3H)2] |
| 22 | [structure with H2N-CH2-CH2-O- and -O-CH2-CH2-NH2 substituents, SO3H groups, Cl atoms] | [difluorotriazine with NH-(2-CH3, 5-SO3H)phenyl] |
|  | $\lambda_{max}$ = 546 nm, 511 nm in water | [difluorotriazine with NH-(4-SO3H)phenyl] |

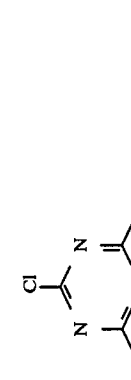

TABLE II-continued

| Example | Triphendioxazine component | Reactive component |
|---|---|---|
| 28 | (structure) | (structure) |
| 29 | " | (structure) |
| 30 | (structure) | (structure) |
| 31 | " | (structure) |
| 32 | (structure) | (structure) |
| 33 | " | (structure) |

TABLE II-continued

| Example | Triphendioxazine component | Reactive component |
|---|---|---|
| 34 | [triphendioxazine with H₂N—(CH₂)₄—O— and SO₃H substituents, Cl groups] | [difluorotriazine linked via NH to benzene with 2,5-(SO₃H)₂] |
| 35 | [same triphendioxazine as 34] | [difluorotriazine linked via NH to benzene with 2-SO₃H] |
| 36 | " | [fluorotriazine linked via NH to benzene with 3-SO₃H] |
| 37 | " | [dichlorotriazine linked via NH to benzene with 2,4-(SO₃H)₂] |
| 38 | " | [dichlorotriazine linked via NH to benzene with 2,5-(SO₃H)₂] |
| 39 | [triphendioxazine with H₂N—(CH₂)₄—O— and SO₃H substituents, Cl groups] | [dichlorotriazine linked via NH to benzene with SO₃H, m:p = 1:1] |

TABLE II-continued

| Example | Triphendioxazine component | Reactive component |
|---|---|---|
| 40 | [structure: triphendioxazine with HN-CH₂-CH₂-O linkers to sulfophenyl groups on both sides, with SO₃H and Cl substituents] | [structure: 2,4,6-trifluoro-1,3,5-triazine] |
| 41 | " | [structure: triazine with NH-phenyl-3-SO₃H and two F] |
| 42 | [structure: same triphendioxazine as Example 40] | [structure: triazine with NH-phenyl-2-SO₃H and two F] |
| 43 | " | [structure: triazine with NH-phenyl-3,5-di-SO₃H and two F] |

TABLE II-continued

| Example | Triphendioxazine component | Reactive component |
|---|---|---|
| 44 | | (structure) |
| 45 | (structure) | (structure) |
| 46 | " | (structure) |
| 47 | (structure) | (structure) |
| 48 | (structure) | (structure) |

TABLE II-continued
| Example | Triphendioxazine component | Reactive component |
|---|---|---|
| 49 | " | 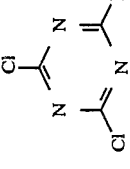 |
| 50 | " | 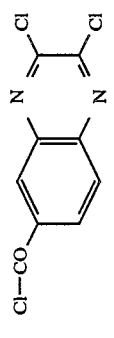 |
| 51 | " | 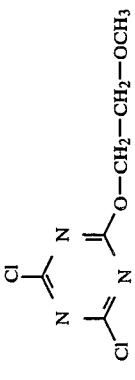 |
| 52 | 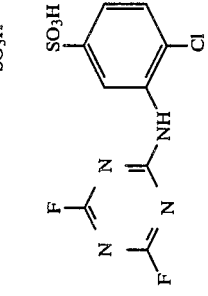 | 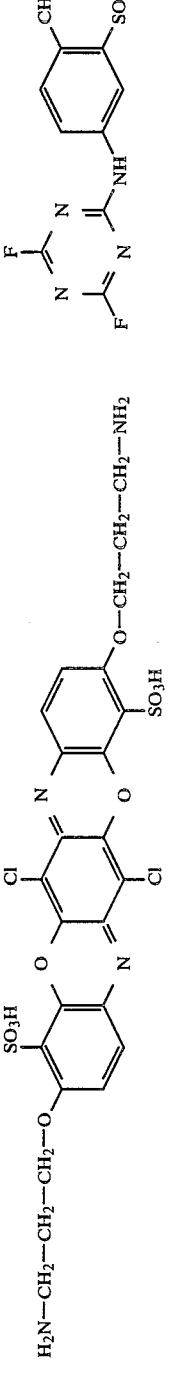 |
| 53 | " | 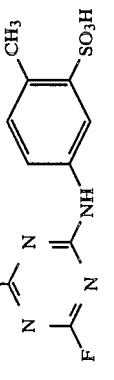 |
| 54 | " | 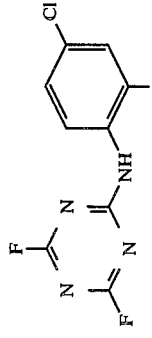 |

TABLE II-continued

| Example | Triphendioxazine component | Reactive component |
|---|---|---|
| 55 | (triphendioxazine structure with CH₃-HN-(CH₂)₃-O- and -O-CH₂-CH₂-CH₂-NH-CH₃ substituents, SO₃H groups) | difluorotriazinyl-NH-C₆H₄-SO₃H (ortho) |
| 56 | " | difluorotriazinyl-NH-C₆H₄-SO₃H (meta) |
| 57 | " | difluorotriazinyl-NH-C₆H₃(SO₃H)₂ (2,5-disulfo) |
| 57 | (same triphendioxazine structure) | difluorotriazinyl-N=C₆H₃(SO₃H)₂ |
| 58 | " | dichlorotriazinyl-NH-C₆H₄-SO₃H (para) |

TABLE II-continued

| Example | Triphendioxazine component | Reactive component |
|---|---|---|
| 59 | | |
| 60 | | |
| 61 | | $\lambda_{max}$ = 543 nm, 508 nm |
| 62 | " | $\lambda_{max}$ = 549 nm, 514 nm in water |

TABLE II-continued

TABLE II-continued

| Example | Triphendioxazine component | Reactive component |
|---|---|---|
| 69 | (structure with cyclohexyl-NH-CH₂-CH₂ groups) | 2,5-disulfo-phenyl-NH-difluorotriazine |
| 70 | (structure with CH₂-OSO₃H groups) $\lambda_{max}$ = 541 nm, 507 nm in water | trifluoro-chloro-pyrimidine |
| 71 | (structure with CH₂-OSO₃H and HO₃SO-CH₂-CH₂ groups) $\lambda_{max}$ = 548 nm, 514 nm in water | dichloro-methoxy-triazine |
| 72 |  | 2-sulfo-phenyl-NH-difluorotriazine |

TABLE II-continued

| Example | Triphendioxazine component | Reactive component |
|---|---|---|
| 73 | | 3-sulfophenyl-NH-dichlorotriazine |
| 74 | Dichloro triphendioxazine with SO₃H, O-CH₂-CH₂-O- (H₂N-CH₂-CH₂-O₂ side) and O-(CH₂-CH₂)₂-NH₂ | 2,5-disulfophenyl-NH-difluorotriazine |
| 75 | Dibromo triphendioxazine with SO₃H, H₂N-CH₂-CH₂-O- and O-CH₂-CH₂-NH₂ | 2-sulfophenyl-NH-difluorotriazine |
| 76 | " | 2,4-disulfophenyl-NH-difluorotriazine |
| 77 | CH₃/Cl triphendioxazine with SO₃H, H₂N-(CH₂)₃-O- and O-(CH₂)₃-NH₂ | 2,5-disulfophenyl-NH-dichlorotriazine |
| 78 | Dimethoxy triphendioxazine with SO₃H, H₂N-CH₂-CH₂-O- and O-CH₂-CH₂-NH₂ | 3-sulfophenyl-NH-difluorotriazine |

TABLE II-continued

| Example | Triphendioxazine component | Reactive component |
|---|---|---|
| 79 | (triphendioxazine structure with H₂N—CH₂—CH₂—O— and —O—CH₂—CH₂—NH₂ substituents, SO₃H groups) | (difluorotriazine linked via NH to 4-methyl-2-sulfophenyl) |
| 79a | (triphendioxazine structure with H₂N—CH₂—CH₂—O— and —O—CH₂—CH₂—NH₂ substituents, SO₃H groups, and two NHCOCH₃ groups) | (difluoropyrimidine linked via NH to 2-sulfophenyl) |

EXAMPLE 80

10.0 g of aminophenoxytriphendioxazine component of the formula

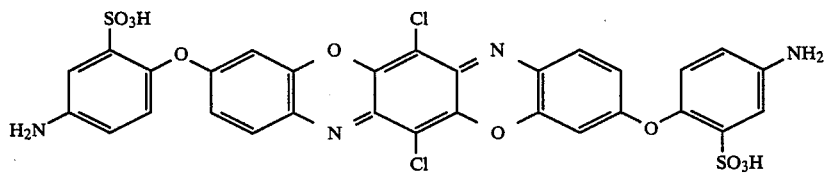

(preparation see below) are dissolved in 200 ml of water. The pH is set to 6.5-7, and at 0°-5° the solution of a reactive component prepared in accordance with the directions of Example 7 from 7.2 g of 2-aminobenzene-1,4-disulphonic acid and 2.9 ml of cyanuric fluoride is added, while the pH in the reaction mixture is constantly maintained at 6.0-6.5 with 2N sodium carbonate solution. After the reaction has ended the solution is warmed to 20°-25° with continued pH control, and stirring is continued in that temperature range for a further 2-3 hours. The dyestuff is salted out of the solution with potassium chloride, the precipitate is filtered off with suction, and the filtercake is washed with 20% strength potassium chloride solution and, after pasting up with phosphate buffer, dried at 50° in vacuo. The product obtained conforms to the formula

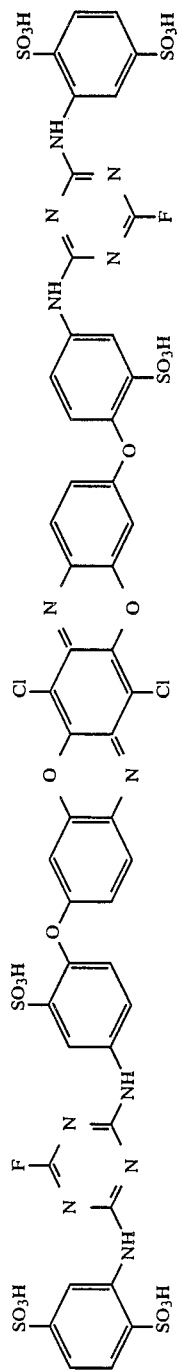

and dyes cellulose fibres by the known reactive dyeing processes in wet-fast bluish red shades.

$\lambda_{max}=538$ nm, ~513 nm in water.

The bis-(p-aminophenoxy)-triphendioxazinedisulphonic acid component used above is prepared as follows:

32.4 g of 2,3,5,6-tetrachloroquinone, 64.0 g of 4-amino-4'-acetylaminodiphenyl ether and 32.4 g of sodium acetate in 250 ml of ethanol are heated under reflux for 2-3 hours until chloranil is no longer detectable. The precipitated brown crystals are filtered off with suction and washed with methanol or ethanol until the run-off is colourless and thereafter with hot water, and the product is dried at 60° C. in a circulating air cabinet.

40.0 g of the 2,5-bis-(4'-(4"-acetylaminophenoxy)-anilino)-3,6-dichlorobenzoquinone obtained are added at 0°-5° C. to a mixture of 100 ml of 20% strength oleum and 100 ml of 96% strength sulphuric acid. The temperature is allowed to rise overnight to 15°. The starting material has disappeared, and two sulphonic acid groups have entered the molecule. 32.8 g of potassium peroxodisulphate are then added to the brown solution, starting at 20° C., in the course of about 1 hour, during which the temperature is allowed to rise to 28°-30°. Stirring is continued at that temperature for approximately a further 30 minutes until the reaction has ended, and the solution is then poured into 1,200 g of ice-water. The suspension obtained can either, for hydrolysis, be directly refluxed for 2 hours, or be filtered off with suction and freed with 20% strength sodium chloride solution from the bulk of the sulphuric acid.

In the latter case, the moist filtercake is subsequently, for hydrolysis, dissolved in 400 ml of water at 100°, 195 ml of 37% strength hydrochloric acid are added to the solution, and the resulting suspension is refluxed for 2 hours. The precipitated product is then filtered off with suction and washed with water until the run-off is virtually neutral.

The product crystallizes in star-shaped crystals by stirring in methanol and adding 25 ml of 2N sodium hyroxide solution. In the form of the sodium salt it conforms to the formula given at the beginning of the example and, according to elemental analysis, contains 2 sulphonic acid groups in the molecule.

$\lambda_{max}=513$ nm, ~540 nm in water.

$^1$H-NMR (CDCl$_3$): $\delta=6.42$ ppm, (2×1H, s), $\delta=6.62-6.69$ ppm, (2×2H, m), $\delta=6.81$ ppm, (2×1H, d), $J_{ortho}\sim 8.4$ Hz), $\delta=7.09$ ppm, (2×1H, d), $J_{ortho}\sim 8.4$ Hz), $\delta=7.27$ ppm, (2×1H, d), $J_{meta}\sim 2.4$ Hz).

EXAMPLE 81

10.0 g of sodium bis-(p-aminophenoxy)-triphendioxazinedisulphonate from Example 80 are dissolved in 200 ml of water.

3.2 ml of 2,4,6-trifluoro-5-chloropyrimidine are added dropwise at 25° in the course of 15 minutes, and the pH value is maintained at 6.0 with 2N sodium carbonate solution until the condensation has ended. The dyestuff obtained, which conforms to the formula

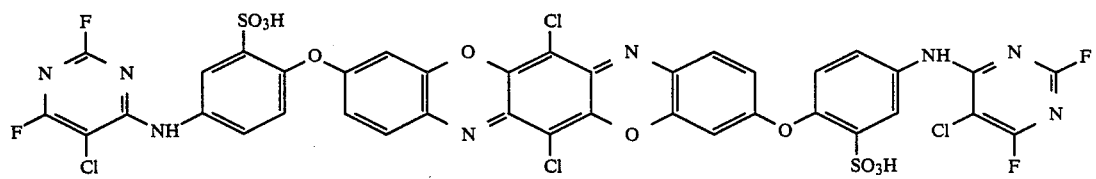

is isolated by salting out, filtering off with suction, washing with sodium chloride solution and drying in the form of a reddish brown powder. It dyes wool in washfast bluish red shades.

EXAMPLE 82

10.0 g of bis-(p-aminophenoxy)-triphendioxazinedisulphonic acid of Example 80 are dissolved in 200 ml of water. To this is added at 0°-5° and pH 6.0 the suspension of a reactive component prepared in accordance with the directions of Example 1 from 5.7 g of 2-aminobenzenesulphonic acid and 3.1 ml of cyanuric fluoride. The pH value is maintained at 6.0 with 2N sodium carbonate solution. Under these conditions, stirring is continued at 0°-5° for a further 2 hours until the condensation has ended, the temperature is then raised to 20°-25°, and the dyestuff is salted out of the solution with potassium chloride. The dyestuff is filtered off with suction, washed with 10% strength potassium chloride solution, pasted up with phosphate buffer solution of pH 6.5 and dried at 50° in vacuo. It conforms to the formula

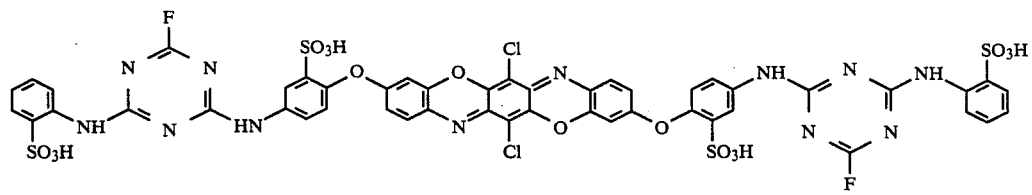

and dyes cellulose fibres in bluish red shades.

$\lambda_{max}=514$ nm, ~547 nm in water.

EXAMPLE 83

Adding 20.0 g of 2,5-bis-(4'-(4"-acetylaminophenoxy)-anilino)-3,6-dichlorobenzoquinone (preparation see Example 80) not to a mixture of equal volumes of 20% strength oleum and 96% strength sulphuric acid but to 100 ml of 20% strength oleum, stirring overnight at 20°, then adding 16.4 g of potassium peroxodisulphate in the course of 1 hour at such a rate that a temperature of 30°-35°C. is maintained in the reaction mixture and subsequently working up, gives a compound of the formula

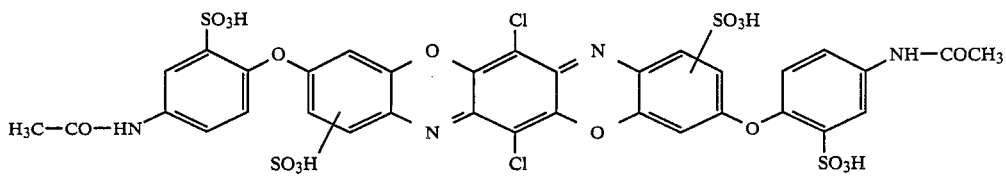

whose hydrolysis product resulting from hydrolysis in dilute sulphuric acid or hydrochloric acid is condensable with 2,4,5-trifluoro-5-chloropyrimidine, 2- or 3-(2,4-difluoro-6-triazinyl)-aminobenzenesulphonic acid, 2-(2,4-difluoro-6-triazinyl)-aminobenzene-1,4-disulphonic acid and 3- or 4-(2,4-dichlorotriazinyl)-aminobenzenesulphonic acid to give reactive dyestuffs which dye cellulose fibres in wet-fast bluish red shades.

Further reactive dyestuffs which dye in reddish blue shades are obtained when in place of the 4-acetylamino-4'-aminodiphenyl ether, the following diphenyl ether compounds are condensed with 2,3,5,6-tetrachloroquinone in Example 80:
4-acetylamino-4'-amino-2'-sulphodiphenyl ether
3-acetylamino-4'-amino-diphenyl ether
3-acetylamino-4'-amino-2'-sulphodiphenyl ether
2-acetylamino-4'-amino-diphenyl ether
and, in addition, the products are subjected to ring closure and hydrolysis analogously to Examples 80 and 83 and thereafter reacted with 2- or 3-(difluorotriazinyl)-or 2- or 3-(dichlorotriazinylamino)-benzenesulphonic acid or 2-(2,4-difluorotriazinyl)- or 2-(2,4-dichlorotriazinyl)-benzene-1,4-disulphonic acid.

The solutions of the reactive component and of the chromophoric component are then simultaneously added dropwise at 0°–5° C. to 50 ml of previously introduced water at such a rate than a pH value of 8.5 becomes established in the reaction mixture and the two solutions have been added at the same time in about 15 minutes.

To be able to maintain the stated pH value during the dropwise addition of the solutions, additional 2N sodium hydroxide solution needs to be metered into the reaction mixture.

This is followed by stirring at 0°–5° C. with constant pH control for some further hours, and the temperature is then allowed to rise overnight to 20° C. with continued pH control and the addition of sodium hydroxide solution. After a pH value of 7.5–8.0 has been set, the dyestuff is salted out with about 150 g of sodium chloride, the precipitate is filtered off with suction, and the filtercake is washed with 500 ml of 20% strength sodium chloride solution.

The filtercake is treated with phosphate buffers and then dried at 50° C. in a vacuum drying cabinet. The dyestuff obtained conforms to the formula

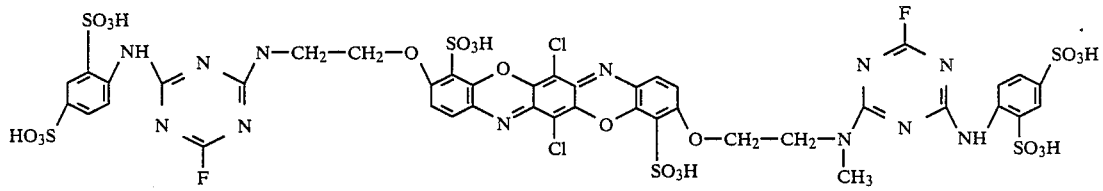

EXAMPLE 84

9.5 g of 4-aminobenzene-1,3-disulphonic acid are dissolved in 50 ml of water by the dropwise addition of 10% strength sodium carbonate solution and setting a pH value of 5.5. After the solution has been cooled, 3.8 ml of cyanuric fluoride are added dropwise at 0°–5° C. in the course of 5 minutes, the pH value is maintained at 4.5–4.7 by means of 10% strength sodium carbonate solution, and, to complete the condensation, stirring is continued under the stated conditions for a further 20 minutes.

8.05 g of an aminoalkoxytriphendioxazine component of the formula (preperation see Example 85)

and dyes cellulose fibres by the dyeing methods known for reactive dyestuffs in light-fast deep bluish red shades.

$\lambda_{max}$=545 nm, 512 nm in water.

EXAMPLE 85

50.0 g of N-[2-(4-amino-2-sulphophenoxy)-ethyl]-N-methylamine hydrochloride (preparation see Example 86) are suspended in 500 ml of water and made to dissolve by adding 2N sodium hydroxide solution until the pH value is 5.5. 80 ml of isopropanol are added, followed by 21.8 g of 2,3,5,6-tetrachloroquinone, and the reaction mixture is heated to 40° C. All the while the pH value is maintained at 5.5 by adding 2N sodium carbon-

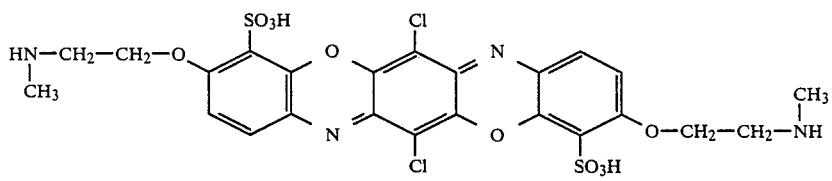

are suspended in 160 ml of water and dissolved at pH 11.5 with 12.9 ml of 2N sodium hydroxide solution immediately before the reaction.

ate solution, and to complete the condensation stirring is continued until the consumption of sodium carbonate has completely ceased. After the reaction has ended, the brown suspension of the condensation product is filtered off with suction, and the filtercake is washed with 500 ml of water and 500 ml of acetone. Drying leaves 56.5 g of a product of the formula

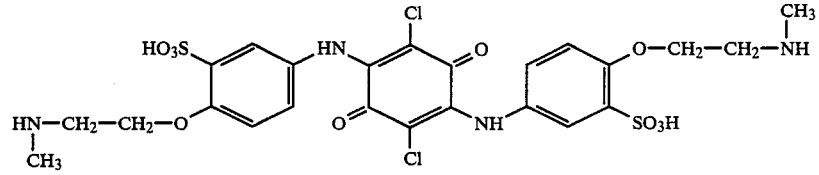

50.0 g of the condensation product obtained are gradually added at 0°–10° C. to 200 ml of 20% strength oleum in the course of 3 hours, the temperature is raised to 25° C., and 40.6 g of potassium peroxodisulphate are then added in the course of about 1 hour, during which the temperature is maintained at 30°–35° C. After the oxidizing agent has been added, the reaction mixture is maintained at 30° C. for a further 30 minutes and is then stirred into 2,000 g of ice. The suspension formed is filtered off with suction at 20° C., and the filtercake is washed with water until neutral and sulphate-free.

EXAMPLE 86

115.3 g of N-[2-(4-aminophenoxy)-ethyl]-N-methylbenzamide, prepared for example from 4-nitrofluorobenzene and N-(β-hydroxyethyl)-N-methylbenzamide in acetonitrile in the presence of potassium hydroxide with subsequent catalytic reduction of the nitro group, as described in Example 3, are added at 15°–20° C. to a mixture of 180 ml of 20% strength oleum and 60 ml of 96% strength sulphuric acid in the course of 45 minutes; the temperature is raised to 25° C., and the progress of sulphonation is monitored by chromatography. When the reaction is complete after stirring overnight, the solution is added to 1.5 kg of ice. After a subsequent two hours of stirring, the crystallized sulphonic acid is filtered off with suction and washed with 1.0 l of cold 3% strength hydrochloric acid until sulphate-free. It can be dried at 60° C. in a circulating air cabinet and then is 105.8 g of product. To hydrolyze the benzoylamino function, the product obtained is refluxed in 1,000 ml of 10% strength hydrochloric acid for several hours, during which the initial suspension gradually dissolves. After stirring until cold, the precipitated benzoic acid is filtered off with suction, and the substance of the formula is isolated in the form of the hydrochloride from the filtrate by concentrating, precipitating with acetone, filtering off with suction and washing with acetone (yield 75.0 g).

$^1$H-NMR (D$_2$O): δ=2.83 (3H,s), δ=3.58 (2H,t), δ=4.53 (2H,t), δ=7.32 (1H,d), δ=7.58–7.61 (1H,m), δ=7.83 (1H,d).

EXAMPLE 87

8.9 g of 3-aminobenzenesulphonic acid are suspended in 72 ml of water+51 g of ice. After 0.1 g of sodium fluoride has been added, 4.6 ml of cyanuric fluoride are added dropwise to the suspension at 0°–5° C., and the pH value in the reaction is maitained at 3.5 with 2N sodium carbonate solution. The result is a clear solution.

10.0 g of aminoalkoxytriphendioxazine component from Example 85 are dissolved in 155 ml of water at pH 11.5 by adding 16 ml of 2N sodium hydroxide solution.

The solutions of the reactive component and of the colour base are then added dropwise at 0°–5° C. to 50 ml of previously introduced water at such a rate that a pH value of 8.5–8.7 becomes established in the reaction mixture and the two solutions have been added at the same time in the course of about 10 minutes. During this operation the pH value in the reaction mixture is maintained by adding further 2N sodium hydroxide solution.

The resulting suspension is maintained at 0°–5° C. for some further hours, and then the temperature is allowed to rise to 20° C. with continued constant pH control. The resulting dyestuff is salted out by adding salt, filtered off with suction and washed with 10% strength sodium chloride solution. After pasting up with phosphate buffer of pH 6.5 the dyestuff is dried at 55° C. in a circulating air cabinet.

The dyestuff obtained conforms to the formula

It dyes cellulose fibres by the dyeing methods known for reactive dyestuffs in light-fast deep bluish red shades.

λ$_{max}$=548 nm, 515 nm in water.

EXAMPLE 88

98.0 g of 3-benzoylaminopropanol are reacted in the manner of Example 3 in 375 ml of acetonitrile with 68.0 g of 4-nitrofluorobenzene in the presence of 28.0 g of pulverulent potassium hydroxide. Working up gives 206 g of product of the formula

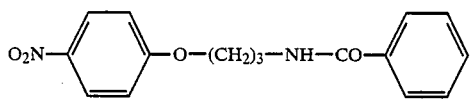

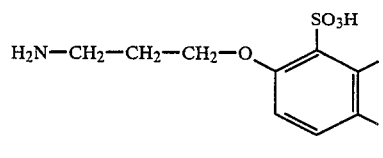

having a melting point of 154°-155° C.

$^1$H-NMR (DMSO) δ=2.03 ppm (2H,m), δ=2.43 ppm (2H,m), δ=4.17 ppm (2H,t), δ=7.10 ppm (2H,d), δ=7.38-7.47 ppm (3H,m), δ=7.80 ppm (2H,d), δ=8.16 ppm (2H,d), δ=8.52 ppm (1H,t).

The catalytic reduction with hydrogen at 50 bar and 50°-60° C. in the presence of Raney nickel in methanol produces the corresponding amino compound having a melting point of 107°-108° C.

Sulphonation of the amino compound in 8% strength oleum at 20° C. and subsequent acid hydrolysis in the manner of Example 3 produces the compound of the formula

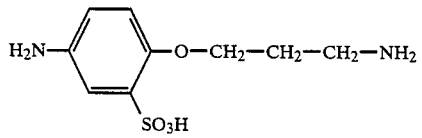

$^1$H-NMR (D$_2$O): δ=2.25 ppm (2H,m), δ=3.34 ppm (2H,t), δ=4.37 ppm (2H,t), δ=7.28 ppm (2H,t), δ=7.56-7.61 ppm (1H,m), δ=7.82 ppm (1H,d).

72.5 g of the above 5-amino-2-(γ-aminopropoxy)-benzenesulphonic acid are dissolved in 725 ml of water and 120 ml of isopropanol at pH 5.5 and condensed at pH 5.5 at 40° C. with 31.6 g of 2,3,5,6-tetrachlorobenzoquinone, and the precipitated product is filtered off with suction, washed with water and acetone and dried at 60° C.

Dissolving 60.0 g of the resulting bis-arylaminodichloroquinone in 240 ml of 20% strength oleum and then oxidizing at 25°-30° C. by gradually adding 48.7 g of potassium peroxosulphate, subsequently stirring at 30° C. for 30 minutes and then working up by pouring into 2.4 l of an ice-water mixture, filtering off the precipitate with suction and washing the filtercake with water gives the triphendioxazine component of Example 10.

EXAMPLE 89

15.1 g of 2-aminotoluene-2-sulphonic acid are suspended in 150 ml of water. After 0.15 g of sodium fluoride has been added, 7.9 ml of cyanuric fluoride are added dropwise at 0°-5° C. in the course of 10 seconds and the pH value is maintained at 3.5 with 2N lithium hydroxide solution.

15 g of an aminopropoxytriphendioxazine component of the formula

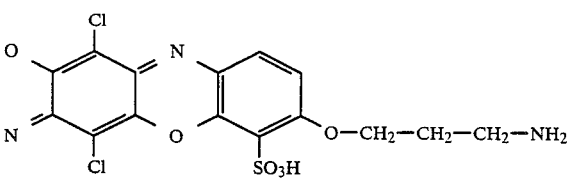

prepared in accordance with the directions of Example 88, are dissolved in 300 ml of water by adding 27 ml of 2N lithium hydroxide solution.

The two solutions are then reacted by simultaneous dropwise addition to water at 0°-5° C. and pH 9.0-9.5, the pH value is the reaction mixture being maintained by adding 2N LiOH solution. After stirring for several hours with pH control the temperature is allowed to rise to 20° C., and the dyestuff is isolated by salting out, filtration and washing with sodium chloride solution.

The dyestuff conforms to the formula

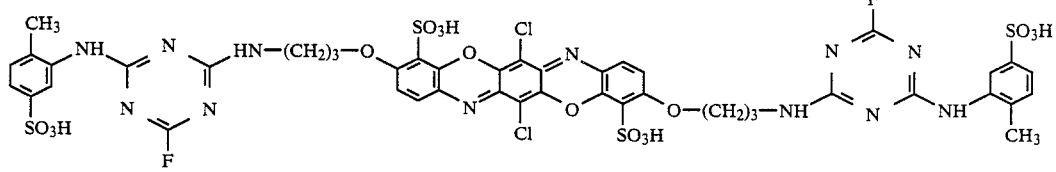

It dyes cellulose fibres from a long liquor in light-fast bluish red shades.

I claim:

1. A dyestuff of the formula

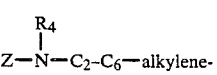

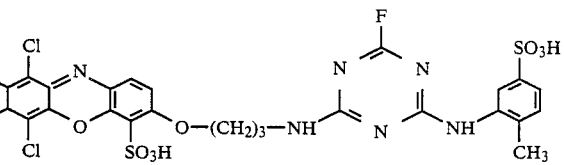

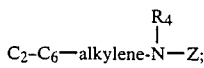

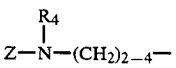

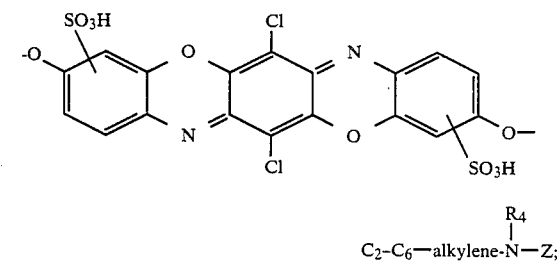

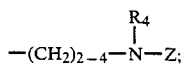

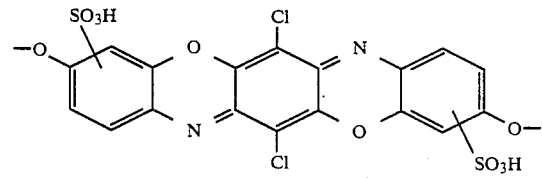

or

-continued

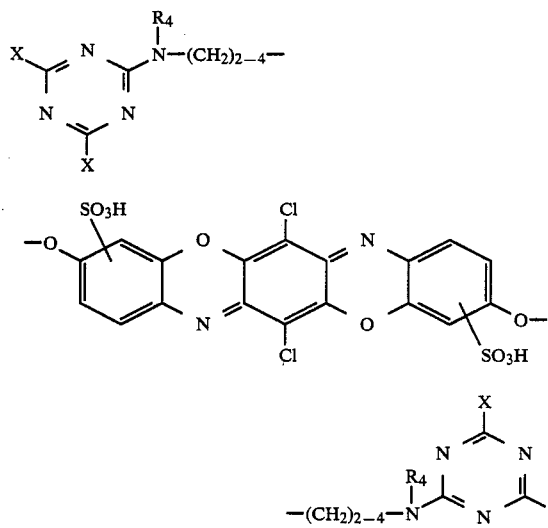

in which
R$_4$=H, C$_1$-C$_4$-alkyl
Z=fibre-reactive halogen-triazinyl or halogen-pyrimidinyl radical,
X=Cl, F and
A=an aminobenzene or aminonaphthalene radical.

2. A dyestuff of claim 1 wherein
Z=fibre-reactive monochlortriazinyl-, monofluorotriazinyl-, 2,4-dichlorotriazinyl-, monohalogenpyrimidinyl-, dihalogen-pyrimidinyl- or trihalogenpyrimidinyl radical.

3. A dyestuff of the formula

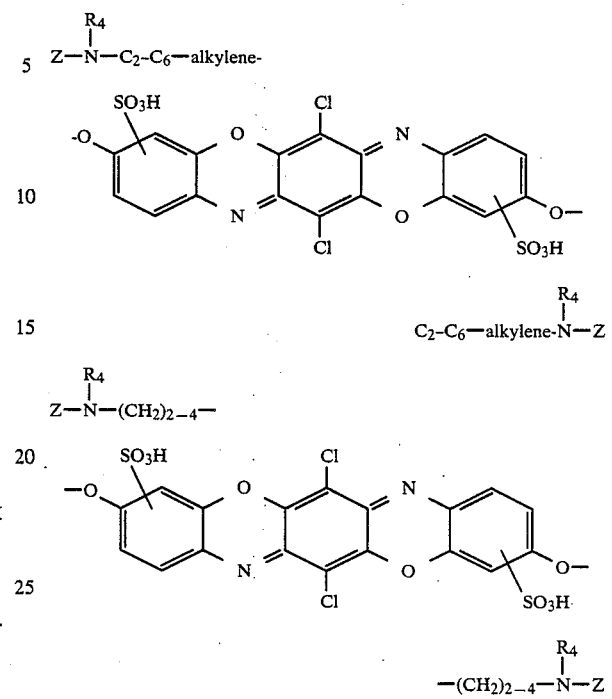

in which

R$_4$=H, C$_1$-C$_4$-alkyl
Z=H.

* * * * *